(12) United States Patent
Jorgenson

(10) Patent No.: US 7,003,799 B2
(45) Date of Patent: Feb. 21, 2006

(54) SECURE ROUTABLE FILE UPLOAD/DOWNLOAD ACROSS THE INTERNET

(75) Inventor: Daniel Scott Jorgenson, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 861 days.

(21) Appl. No.: 09/774,951

(22) Filed: Jan. 30, 2001

(65) Prior Publication Data
US 2002/0104022 A1   Aug. 1, 2002

(51) Int. Cl.
G06F 15/16   (2006.01)
(52) U.S. Cl. .......................................... 726/12; 705/51
(58) Field of Classification Search ................ 713/201; 705/51; 709/219; 726/12
See application file for complete search history.

(56) References Cited

U.S. PATENT DOCUMENTS

| | | | | |
|---|---|---|---|---|
| 5,706,507 | A * | 1/1998 | Schloss ................... | 707/104.1 |
| 6,253,248 | B1 * | 6/2001 | Nakai et al. ................ | 709/237 |
| 6,345,300 | B1 * | 2/2002 | Bakshi et al. ............... | 709/229 |
| 6,463,454 | B1 * | 10/2002 | Lumelsky et al. .......... | 718/105 |
| 6,708,200 | B1 * | 3/2004 | Ura et al. .................... | 709/203 |

* cited by examiner

Primary Examiner—Gregory Morse
Assistant Examiner—Andrew L. Nalven

(57) ABSTRACT

A system and method are provided for performing file transfers using an HTTP- or HTTPS-based Supplier Transport Gateway to connect Customer and Supplier Repositories located behind their respective firewalls. In some embodiments, the Transport Gateway is placed outside the Supplier firewall, and a Supplier Transport Proxy inside the firewall connects the Transport Gateway to the internal Supplier Repositories. In other embodiments, the Transport Gateway and Transport Proxy are reversed, the Proxy residing outside the Supplier firewall and relaying Customer HTTP/HTTPS traffic to the Transport Gateway inside the firewall, which then connects to the internal Supplier Repositories. In either case, the HTTP- or HTTPS-based Customer Repository connects through a Customer Proxy to the Supplier's Transport Gateway to request file upload/download operations. In turn, the Transport Gateway implements the Supplier's request validation policy, and Supplier Repository routing rules that abstract the Supplier Repository topology to the Customer. The Transport Gateway then performs a corresponding upload/download operation against the selected Supplier Repository using HTTP, HTTPS, FTP, or a similar protocol.

29 Claims, 10 Drawing Sheets

GET␣/tran/bin/xaction.pl?HP-ESC-S-ID=349de55c1a39d2f600& /610 /620 /625

HP-ESC-S-AUTH=290365434&

Geography=USA& /632 /635

AppName=Asset& /637

Version=1.x& /639

FileName=newswefg.dat␣HTTP/1.0 CR LF /641

/643

SWOP-Xaction=␣tranGet CR LF

HTTP/1.0␣200␣OK CR LF — 640

SWOP-Xaction=␣tranGet CR LF

SWOP-Version=␣1.0.0 CR LF

SWOP-Status=␣1␣0␣OK CR LF — 642

SWOP-Data=␣Owner=scott&

Group=users& /645 } 644

/647

Mode=644& /649

/652

Timestamps=<T3>&Create=979874581&Modify=979874820&

Access=979874820 CR LF

/646

Content-Type=application/x-octet-stream CR LF

CR
LF

Hello␣world /650

FIG. 6B

POST␣/tran/bin/xaction.pl␣http/1.0 CR LF  —660, —662

SWOP-Xaction=␣tranPut CR LF —664

SWOP-Data=␣HP-ESC-S-ID=349de55c1a39d2f600& —672

HP-ESC-S-AUTH=290365434& —674

Geography=USA& —678   —676

AppName=Asset& —679

Version=1.x& —680

FileName=newswefg.dat&

Owner=scott& —681   —682

Group=users& —683

Mode=644 CR LF —685

Content-Type=␣application/x-object-stream CR LF —666

Content-Length=␣11 CR LF —668

CR LF —670

Hello␣world

FIG. 6C

HTTP/1.0␣200␣OK CR LF —688

SWOP-Xaction=␣tranPut CR LF

SWOP-Version=␣1.0.0 CR LF —690

SWOP-Status=␣1␣0␣OK CR LF

FIG. 6D

SECURE ROUTABLE FILE UPLOAD/DOWNLOAD ACROSS THE INTERNET

BACKGROUND OF THE INVENTION

1. Field of the Invention

The present invention relates generally to computer networks and, more particularly, to transferring files among computers over the Internet using the Hypertext Transfer Protocol.

2. Related Art

The Hypertext Transfer Protocol (HTTP) is an application-level messaging protocol used for distributed, collaborative information systems. As is known, since 1990 HTTP has been in use on the Internet (the global network of all computers interconnected via Transmission Control Protocol/Internet Protocol, TCP/IP). The principal application in which HTTP has been used is the World Wide Web global information initiative, providing support for hypermedia, electronic commerce, distributed applications, etc. There is a wide variety of information that is publicly known about HTTP. Indeed, there are many documents, known as Internet RFCs (Requests for Comments), which specify a great deal of information about HTTP. For example, RFC 2068, RFC 2296, RFC 2227, RFC 2295, RFC 2145, RFC 2109, RFC 2069, RFC 1945, and RFC 2518 are just a few of the published documents that specify various features and aspects of HTTP. Each of the foregoing, publicly available documents is hereby incorporated by reference in its entirety.

As is further known, the HTTP protocol may be conducted securely across the public Internet using Secure Sockets Layer (SSL) technology. Among other features, this security scheme provides encryption, and hence privacy, to HTTP messages as they traverse the network. When used with HTTP server digital certificates (as is typically the case), HTTP server authentication is also supported for the client. HTTP conducted in this manner is referred to in the art as HTTPS. Unless otherwise specified, as used herein, the term HTTP should be understood to encompass both HTTPS and the unsecured form.

Likewise, there are various versions of HTTP, including versions HTTP 1.0, HTTP 1.1, HTTP-NG, etc. Unless otherwise specified, as used herein, the term HTTP should be understood to be version-independent.

As is known, HTTP is based on a request/response paradigm. An HTTP client computer program establishes a connection with an HTTP server program, executing on a server computer known to the client by its Internet Protocol (IP) address or Domain Name System (DNS) name. (In the latter case, the HTTP client first uses DNS to translate the DNS name into an IP address.) The HTTP client then sends an HTTP request message. The HTTP request message includes: a method, specifying the general operation the server is requested to perform; a Uniform Resource Identifier (URI), specifying the resource against which the server is requested to perform the method; and an HTTP protocol version. The request message may further include various request headers (specifying additional attributes and modifiers to the request) and a request body (specifying arbitrary, application-defined information to be used in handling the request).

The server processes the request and sends an HTTP response message in reply. The HTTP response message includes the HTTP protocol version and an overall success or error code. The response message may further include various response headers (specifying additional informative attributes concerning the server, its handling of the request, or the response) and a response body (providing arbitrary, application-defined information pursuant to the transaction).

In practice, an HTTP proxy program, executing on another server computer, frequently plays a role in relaying the HTTP request and response messages, as well. HTTP proxies are used when the HTTP client and server are separated by an Internet firewall (a partitioning of computers on the network into multiple domains, such that the client and server computers reside in different, non-communicating domains). In this case, rather than connecting directly to the HTTP server on the server computer, an HTTP client will instead connect to an HTTP proxy using the proxy's IP address or DNS name. The client will send to the proxy a modified HTTP request message, containing the IP address or DNS name of the desired HTTP server. The proxy, which is allowed to communicate across the firewall, will then connect to the HTTP server on the client's behalf, and relay the HTTP request message to the server. In turn, the proxy will likewise relay the HTTP response message from the server back to the client.

In a typical HTTP interaction, the HTTP client computer is executing a Web browser program, and the URI refers to a Web page (frequently authored using Hypertext Markup Language, HTML). The HTTP request is thus a request for the Web server program to fetch the indicated page (from the server computer operating system's file system), and download it to the Web browser for display to the user. The HTTP response body includes the file content for the requested page.

In another typical HTTP interaction, the URI may refer to an HTTP server extension program (authored using any of a wide variety of Web server extension frameworks, such as CGI, FastCGI, server plugins, servlets, etc). The HTTP request message may further include request headers and/or a request body containing arguments to the HTTP server extension program. The HTTP request is thus a request for the HTTP server program to invoke the HTTP server extension program with the given arguments, and return an HTTP response from the program. Web form handling, frequently used in Web commerce, is an example of this kind of HTTP interaction.

Although these are typical HTTP interactions, it is important to note that utilization of HTTP is not fundamentally restricted to these examples. As is known, the HTTP protocol itself allows extension request and response headers to include arbitrary, application-defined values. Furthermore, both HTTP request and response bodies are permitted to include arbitrary, application-defined content of any size. HTTP clients, likewise, are not restricted to being Web browsers; any program can be constructed as an HTTP client. Finally, HTTP proxy and server implementations generally observe all of these allowances.

It is sometimes desirable to exchange files of various kinds, on a regular or ad-hoc basis, between one party and various other independent parties, who have a relationship of some kind with the first. For example, a business providing computer support services may desire to receive defect log files from its customers' contracted computers, for purposes of centralized troubleshooting. Similarly, another department of the same business may desire to receive inventory files of installed software from its customers' contracted computers, for purposes of software update consultation. A third department of the business may desire to receive hardware utilization metrics from its customers' contracted computers, for purposes of scalable billing. In all three cases, various files need to be transferred to the business from its customers.

Transfers in the opposite direction are sometimes desirable, as well. For example, the second department of the business mentioned above may desire to allow recommended software updates to be downloaded to its customers' contracted computers, following a consultation engagement.

FIG. 1 illustrates these scenarios. In FIG. 1, the party providing the services is referred to herein as Supplier 120. The parties relating with Supplier 120, such that they need to upload and download files to/from Supplier 120, are referred to herein as Customers 110n (where n=A, B, ... ). Thus the term, Supplier/Customer Problem, refers herein to the general problem of providing a distributed computer architecture which most cost-effectively enables file transfers of the kind just described.

There are several aspects of the Supplier/Customer Problem that influence solution design. One such aspect is the recognition that Suppliers and Customers are typically independent organizations. They do not share their proprietary computer networks, which are segregated from the Internet by firewalls. Although Suppliers 120 can be presumed, by the nature of their business, to have a continuous Internet server (e.g., Web server) presence, some Customers 110n may not have continuous Internet connections (although the pervasiveness of Internet Service Providers, ISPs, gives Customers without such connections a means to periodically gain client access to Internet 140 as needed).

A related recognition is that the Customer computer on which a file is to reside (referred to herein as the Customer Repository 130n) is not necessarily directly connected to Internet 140, even though the Customer network may be thusly connected (e.g., via a proxy across a Customer firewall 150n). Similarly, the Supplier computer on which a file is to reside (referred to herein as Supplier Repository 130n) is likewise not necessarily accessible directly from Internet 140. Although Supplier 120 may have an Internet presence, Supplier Repository 130n may be sealed from Internet 140 via Supplier firewall 160.

A third aspect of the Supplier/Customer Problem is security. Suppliers 120 often desire to transfer files only to and from authentic, authorized Customers 110n. Similarly, Customers 110n often desire assurance that files are only being transferred to and from authentic Suppliers 120. Furthermore, some security-conscious Customers 110n will desire that their file contents be private (i.e., encrypted) across the file transfer.

A fourth aspect of the Supplier/Customer Problem is repository flexibility. Suppliers 120 sometimes must handle multiple relationships with multiple sets of Customers 110n, where the relationships are best handled out of different departments within Supplier 120 (as in the example given above). In these cases, it is frequently desired to have multiple Supplier Repositories 130n, to better organize the Supplier's internal business processes. For example, one department within a Supplier 120 could desire to use one particular Repository worldwide. Another department, pursuant to a different business relationship with a different (but possibly overlapping) set of Customers, could desire to use three other Repositories, one for European business, one for Asian business, and one for Americas business. The layout of specific Supplier Repositories is referred to herein as the Supplier Repository "topology". Furthermore, should the Supplier Repository topology change over time, it is often desired to limit the extent of such changes so that Customers 110n are unaffected. For example, if the aforementioned department with three Repositories re-organized to use just one in the future, it would be desired to keep this re-organization internal to the Supplier. In that way, Customers' Repository software, performing file transfers against Supplier Repositories 130n, would remain unchanged, resulting in a greatly lowered maintenance cost.

A fifth aspect of the Supplier/Customer Problem is immediate delivery feedback. It is usually desired that Customer Repositories be able to readily detect when file uploads/downloads against Supplier Repositories fail. This is necessary to minimize the costs of supporting the solution.

A sixth aspect of the Supplier/Customer Problem is file scalability. Depending on the application, files to be uploaded/downloaded will have varying lengths and contents. Some may be very short, while others may be millions of bytes in length. Some may encode textual characters, while others may be binary.

Finally, a last aspect of the Supplier/Customer Problem is infrastructure re-use. In order to be maximally cost-effective, it is desired to implement a solution which addresses all the above aspects, and yet uses a minimum of new technologies. Instead, existing network protocols, computers, software and architecture should be leveraged. Doing so serves to minimize implementation cost within both the Supplier and Customer organizations. This is most important with respect to the cost of implementation on the Customer side since, while there is but one Supplier 120, there are many Customers 110n, each particularly sensitive to cost.

Thus a solution to the Supplier/Customer Problem must address all of the preceding issues.

Various techniques are known in the art for exchanging files across computer networks. Several of these have been applied to the Supplier/Customer Problem in the past. The most applicable prior art utilizes the Internet as the fundamental substrate across which Supplier/Customer file transfers occur. The Internet is indeed an attractive component of a Supplier/Customer Problem solution. This is because (as discussed above) in recent times Suppliers 120 can be presumed to have a continuous Internet server presence, while even those Customers 110n who do not, can cheaply obtain an on-demand, client-only presence through any of a large number of ISPs. Thus a Supplier/Customer Problem solution utilizing the Internet, with the Customer as a file upload/download client and the Supplier as a server, is clearly promising. However, prior art solutions based upon the Internet still fall short of addressing all of the specific issues described above regarding the Supplier/Customer Problem.

For example, the File Transfer Protocol (FTP) has often been used in the past to perform file transfers across a simple client/server architecture, as illustrated in FIG. 2A. As is known, there is a wide variety of information publicly available concerning FTP, including such Internet RFCs as RFC 2228, RFC 959, RFC 783, and RFC 765. The foregoing documents are incorporated herein by reference in their entireties.

A typical FTP session involves an FTP client computer program and an FTP server program executing on a server computer 210n whose IP address or DNS name are known to the client computer 220 (FIG. 2A). (As in the HTTP case, an FTP proxy 230 may also be involved, to relay the FTP messages and data across an Internet firewall 240.) Upon receiving a new connection request, FTP server 210n requests that FTP client 220 authenticate itself. FTP server implementations generally support user ID/password-based authentication, pursuant to whatever underlying user account scheme is provided by the server computer's operating system. A typical UNIX-based FTP server, for example, would authenticate clients based on a user ID/password pair resolved against the 'passwd' database. A typical Microsoft Windows/NT-based FTP server would instead authenticate clients based on a user ID/password pair resolved against the NT domain. Upon authentication, various FTP commands are supported in the FTP protocol by client 220, proxy 230 and server 210*n* to upload and download files to/from the filesystem of FTP server 210*n*.

This overall FTP architecture presents numerous problems from the standpoint of the Supplier/Customer Problem. First, FTP proxy utilization for FTP client/server communication across firewalls is not currently as widespread as with other prior-art protocols (to be discussed below). This makes the widespread applicability to Customers of an FTP-based solution problematic, since Customers must either have FTP proxy access across their firewall to the Internet, or have no firewall at all.

Second, the security scheme used by known FTP servers requires that Customers have user accounts on the Supplier FTP server computer 210*n*. User account maintenance on computer operating systems typically incurs significant operating costs, especially when large numbers of user accounts are concerned. Furthermore, the presence of user accounts on Internet-accessible computers often creates security concerns, requiring further operating investment to monitor. Thus known FTP servers' authentication frameworks are not conducive to the security and cost-effectiveness considerations in the Supplier/Customer Problem. At a minimum, the solution must easily allow for other sorts of authentication/authorization frameworks, besides those rooted in the server computer operating system's user account scheme.

A related security concern with FTP is the lack of support within known FTP servers for private file transfers. This again limits the applicability of the FTP architecture for solving the Supplier/Customer Problem, since some sensitive Customers will require encryption during the upload/download.

Third, the limitation in all known FTP servers to just those files accessible to the server computer operating system's file system is problematic. As was discussed earlier, it is often desired to be able to distribute files on multiple, internal Supplier Repositories which are not directly accessible from the Internet. It is also desirable to hide changes in the Supplier Repository topology from Customers. If FTP server 210*n* is placed outside the Supplier's firewall (FIG. 2A), FTP server 210*n* is not inherently able to cross the firewall and access remote, internal Supplier Repositories. Instead, known FTP servers only have access to files available via their server computer operating system's file system.

To handle this limitation, some prior-art FTP-based systems use modified architectures, illustrated in FIGS. 2B and 2C. In one such prior-art modified FTP architecture (FIG. 2B), a distributed-file-system solution, such as Network File System (NFS), marries the publicly-accessible FTP server computer file system with the various internal Supplier Repository file systems. Supplier Repository topology is hidden from Customer Repositories by the use of virtual path schemes supported by the distributed file system technology employed. But known distributed file systems were not designed for secure cross-firewall access, and so many security concerns apply with this approach. In addition, Supplier Repository topology cannot change without also necessitating re-configuration of the Supplier firewall. This coupling increases the cost of the solution.

In another such prior-art modified FTP architecture (FIG. 2C), rather than having the FTP server outside the firewall, a conventional FTP proxy 260 is used by the Supplier to proxy Customer FTP traffic from outside Supplier firewall 250, to the internal Supplier Repositories 210*n*, each of which hosts an FTP server program. However, this architecture shares the previous problem of coupling change in the Supplier Repository topology with reconfiguration of the Supplier firewall. Worse, the Customer Repository FTP clients are still required to know the particular topology of the Supplier Repository computers: their DNS names, and an understanding of which Supplier Repository handles which kind of file, which Customer geographic location, etc. This makes infeasible to mask from Customers any change in the Supplier Repositories.

As an alternative to FTP-based prior-art systems, Internet electronic mail (e-mail) has been used in the past to address the Supplier/Customer Problem, as illustrated in FIG. 3. As is known, these solutions use such e-mail architectural components as Simple Mail Transfer Protocol (SMTP), the Internet mail message format, and the popular 'sendmail' e-mail client/server program. Again, there are many documents discussing these components, including Internet RFC 822, RFC 821, and other documents. These publicly available documents are hereby incorporated by reference in their entireties.

As is further known, in a typical e-mail delivery, an SMTP client computer program (e.g., executing on Customer Repository client computer 305) connects to an SMTP server program executing on a server computer whose IP address or DNS name are known to the client. The server computer may be the ultimate destination of the e-mail message (e.g., one of Supplier Repositories 360*n*), or it may be a mail exchange (e.g., Customer mail exchange network 310) for use when a direct connection to the destination computer is not possible (e.g., prevented by Internet firewalls 340 and 350 or a down computer) or desirable (for example, due to bandwidth concerns). If a mail exchange, SMTP server program 310 there will proxy the e-mail message on to the ultimate destination (e.g., one of Supplier Repositories 360*n*), or perhaps another mail exchange (e.g., global-area mail exchange network 330 and thence Supplier mail exchange network 320) until finally the destination is attained. The receiving SMTP server program stores the message body to the server computer's file system or a database. In this way, prior-art solutions for the Supplier/Customer Problem perform file upload from Customer to Supplier Repository. File download is achieved via e-mail sent from Supplier to Customer Repository.

Alternately, e-mail may use other transport protocols besides SMTP, as well (although when travelling across the public Internet 330 SMTP is generally used). SMTP client programs are likewise very diverse, as are server programs and stores (some, for example, store messages to databases). But, as is known, all share an essential feature of e-mail: it is asynchronous, meaning the client program disconnects without ascertaining the delivery success or failure.

This characteristic alone makes the e-mail architecture a poor choice for solving the Supplier/Customer Problem, where immediate delivery feedback is desired. All known email-based solutions to the Supplier/Customer Problem in the art either forgo delivery feedback entirely, or incorporate complicated methodologies for discerning delivery success/failure from so-called "bounced" messages. Compared to Supplier/Customer Problem solutions where immediate delivery feedback comes for free (as it does, for example, with FTP and HTTP, due to the synchronous nature of the protocols and architectures) any such methodologies are relatively costly to construct and support.

Furthermore, e-mail is not designed for scalable file size and content. For example, depending on the size of a message, and the mail exchanges across which the message travels, a message may be split into multiple messages because the original was too large. As is known, re-assembly is generally not automatic, due to the wide heterogeneity in today's e-mail systems. Similarly, depending on the content of a message and the exchanges across which it travels, a message may be encoded as it travels. As with re-assembly, decoding is frequently not automatic. Thus it is a further cost for a Repository server to be constructed and supported to reassemble the pieces, and/or decode the message. As with immediate delivery feedback, above, when other Internet application protocols and architectures (such as FTP and HTTP) do not have such issues, there is little justification for e-mail.

As a final alternative to both FTP- and e-mail-based prior-art systems, HTTP has been used with a simple client/server architecture to perform file transfers in prior art, as illustrated in FIG. 4A. As is known, the HTTP protocol supports the GET method, in which the URI is taken by the HTTP server program to be the name of a resource whose content is to be downloaded, in the HTTP response body, to the HTTP client program. In particular, the resource named in the URI can be a file to be downloaded. Known HTTP server programs require the file to be accessible via the HTTP server computer operating system's file system.

The HTTP protocol also supports the PUT method, in which the URI is taken by the HTTP server program to be the name to assign to a file whose content is to be uploaded, in the HTTP request body, from the HTTP client program. The URI is expected to be the name to assign to the new file. Known HTTP server programs require the location in which the file is placed to be accessible via the HTTP server computer operating system's file system.

In known prior solutions to the Supplier/Customer Problem, the GET and PUT methods have been used to download and upload files, respectively, from and to HTTP server computers. HTTP proxies are used in those cases where the HTTP client and server are segregated. Indeed, there are several positive aspects to utilization of HTTP for file transfer. Because HTTP request and response bodies (in which the file contents are placed for transfer) support arbitrary data, file size and content are not an issue. Because the HTTP architecture is synchronous, immediate delivery feedback is a given. And because HTTP client/server support for encryption via HTTPS is widespread, a ready privacy option is available.

But as a solution for the Supplier/Customer Problem, this simple HTTP architecture has major shortcomings. First, the PUT method is not implemented in some HTTP client, server and proxy programs, limiting the widespread applicability of the simple HTTP architecture to file download only.

Second, the simple HTTP architecture, like the FTP architecture, lacks support for various Customer authentication and authorization schemes. HTTP server programs commonly provide built-in support for these security features to only the same extent that FTP servers do: via the underlying user account structure of the server computer's operating system. Thus the same problems apply to the simple HTTP architecture's capacity to support authentication and authorization as apply to the FTP architecture.

Finally, the simple HTTP architecture, like the FTP architecture, lacks support for multiple, internal Supplier Repositories whose topology are shielded from Customer Repositories. Like FTP server programs, known HTTP server programs access files via their server computer operating system's file system. To address this limitation, the simple HTTP architecture can be extended using distributed file systems (FIG. 4B) or an HTTP proxy (FIG. 4C) on the Supplier side, just as the FTP architecture could be extended (as discussed above). But these extensions still suffer from the same problems as they did in the FTP case.

As a result, there is a need for an improved system for uploading and downloading files between distributed, segregated Supplier and Customer Repositories, such that all of the issues disclosed above are resolved.

BRIEF SUMMARY OF THE INVENTION

The present invention overcomes the limitations of prior art systems, by using an HTTP- or HTTPS-based Supplier Transport Gateway to connect Customer and Supplier Repositories located behind their respective firewalls. In some embodiments, the Transport Gateway is placed outside the Supplier firewall, and a Supplier Transport Proxy inside the firewall connects the Transport Gateway to the internal Supplier Repositories. In other embodiments, the Transport Gateway and Transport Proxy are reversed, the Proxy residing outside the Supplier firewall and relaying Customer HTTP/HTTPS traffic to the Transport Gateway inside the firewall, which then connects to the internal Supplier Repositories. In either case, the HTTP- or HTTPS-based Customer Repository connects through a Customer Proxy to the Supplier's Transport Gateway to request file upload/download operations. In turn, the Transport Gateway implements the Supplier's request validation policy, and Supplier Repository routing rules that abstract the Supplier Repository topology to the Customer. The Transport Gateway then performs a corresponding upload/download operation against the selected Supplier Repository using HTTP, HTTPS, FTP, or a similar protocol.

BRIEF DESCRIPTION OF THE DRAWINGS

FIGS. 6A and 6B, are exemplary HTTP messages for a file download operation, in accordance with some embodiments of the invention.

FIGS. 6C and 6D are exemplary HTTP messages for a file upload operation, in accordance with some embodiments of the invention.

DETAILED DESCRIPTION OF THE INVENTION

The system and method of the present invention provide an improved HTTP-based architecture for uploading and downloading files between distributed, segregated Supplier and Customer Repositories, across a global-area computer network (e.g., the Internet). As a result, the above-discussed limitations of prior art solutions for the Supplier/Customer Problem are overcome.

Figure 1:
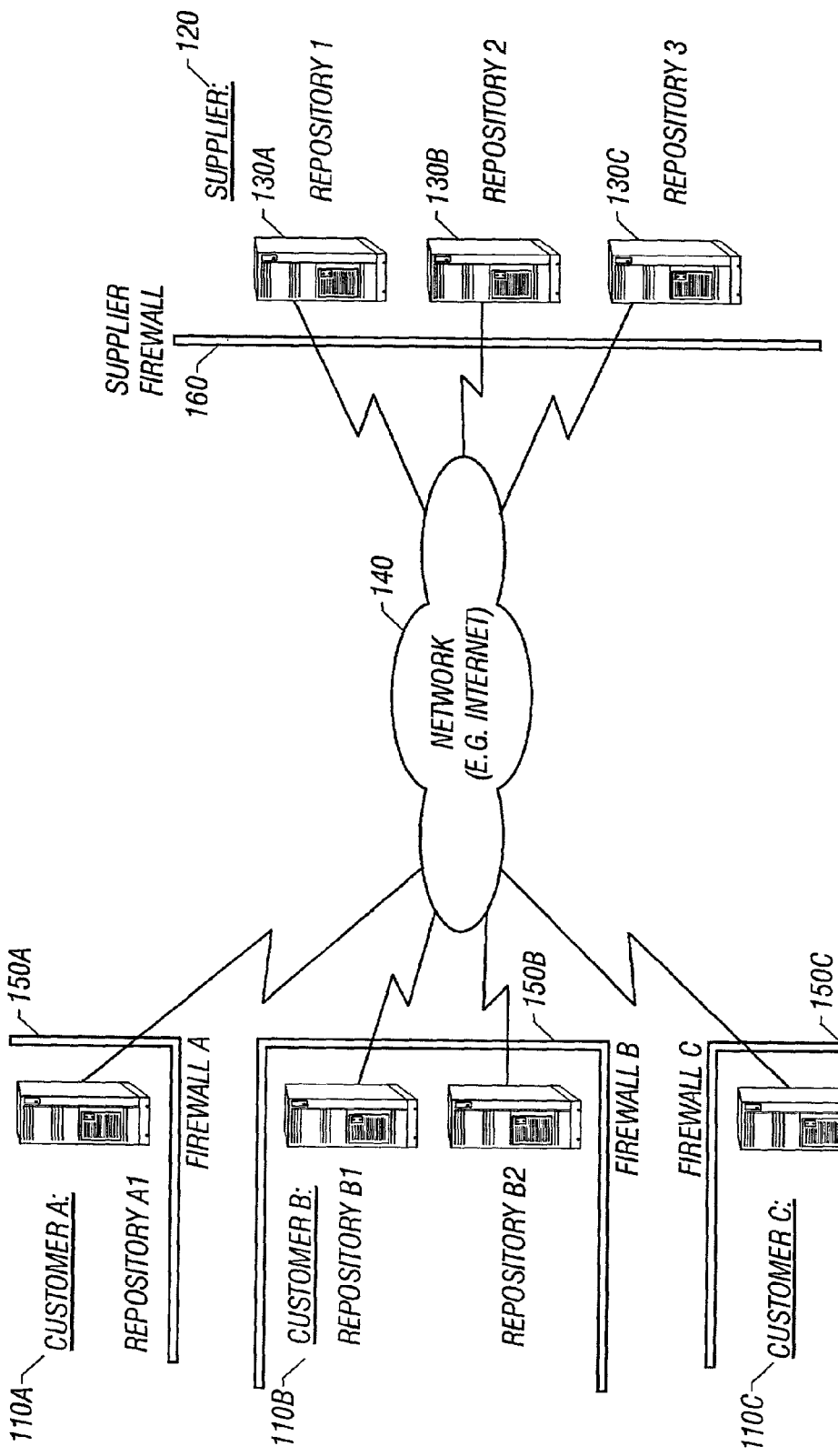
FIG. 1 is a block diagram of a typical prior art system for uploading and downloading information among Customer and Supplier Repositories.
Figure 2A:
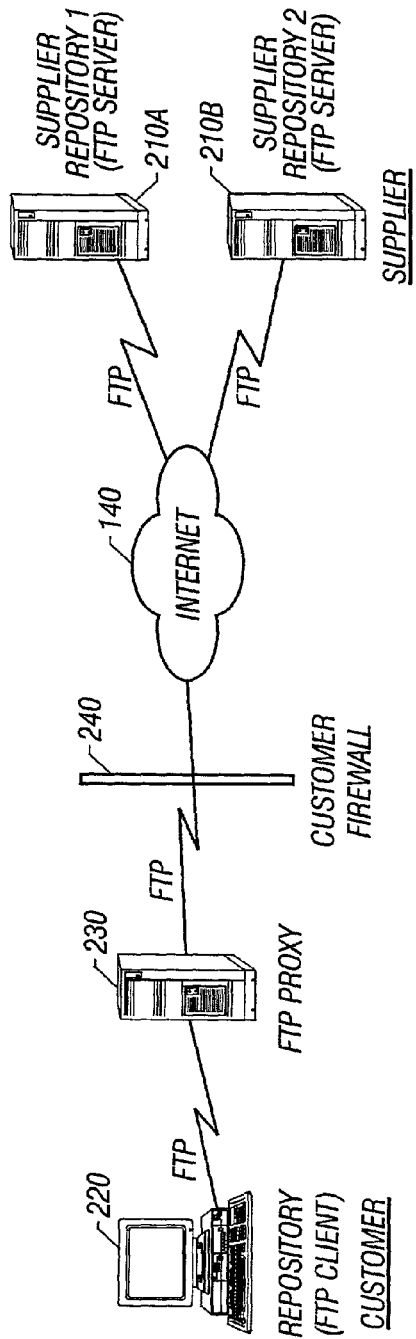
FIGS. 2A, 2B and 2C are block diagrams of prior art computer systems for uploading and downloading information among Customer and Supplier Repositories using FTP.
Figure 2B:
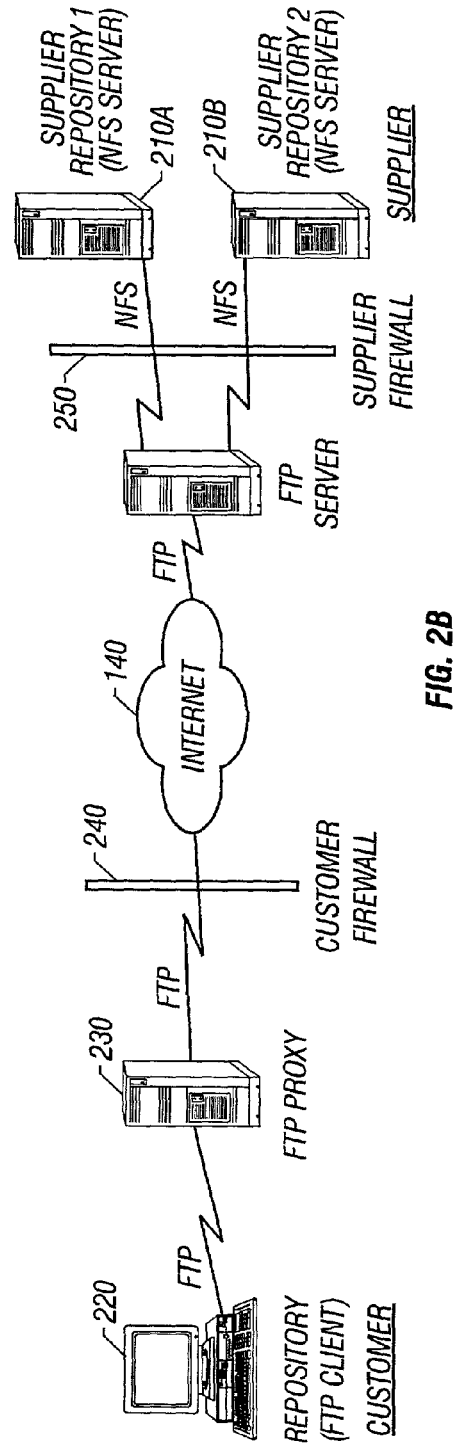
Figure 2C:
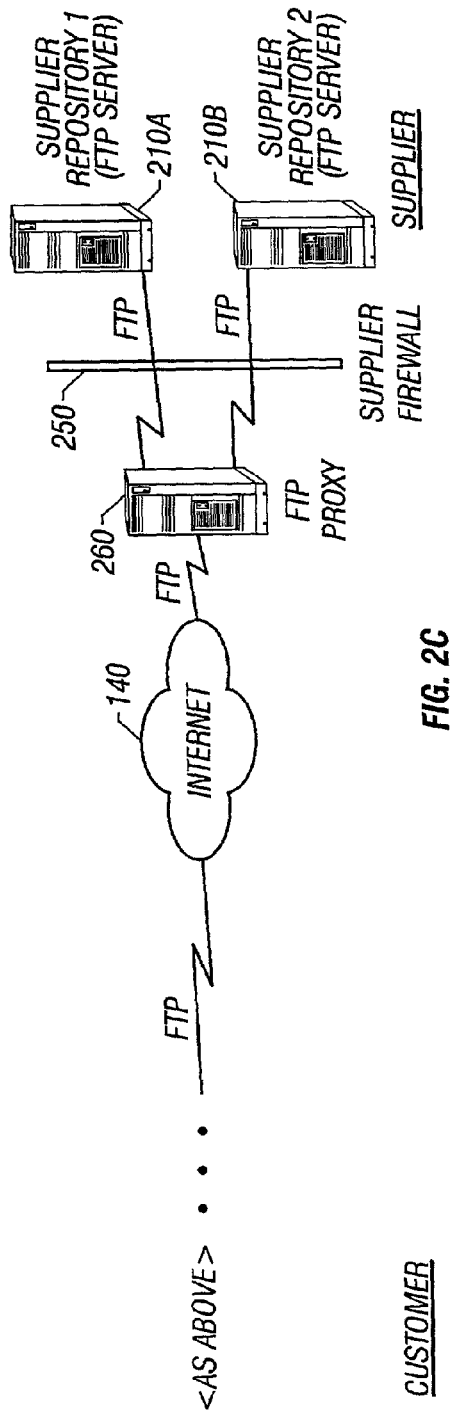
Figure 3:
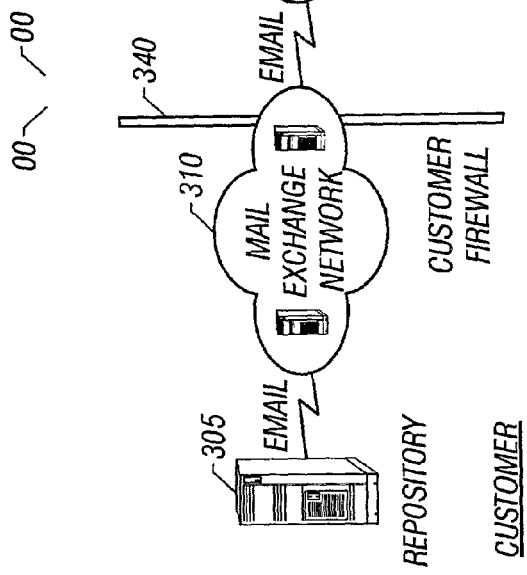
FIG. 3 is a block diagram of a prior art computer system for uploading and downloading information among Customer and Supplier Repositories using e-mail.
Figure 4A:
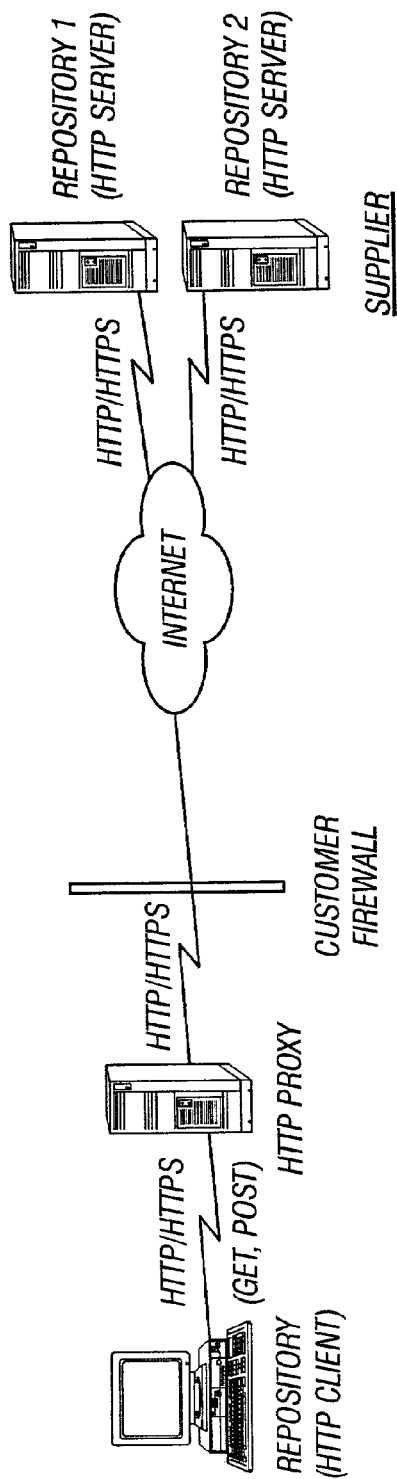
FIGS. 4A, 4B and 4C are block diagrams of prior art computer systems for uploading and downloading information among Customer and Supplier Repositories using HTTP.
Figure 4B:
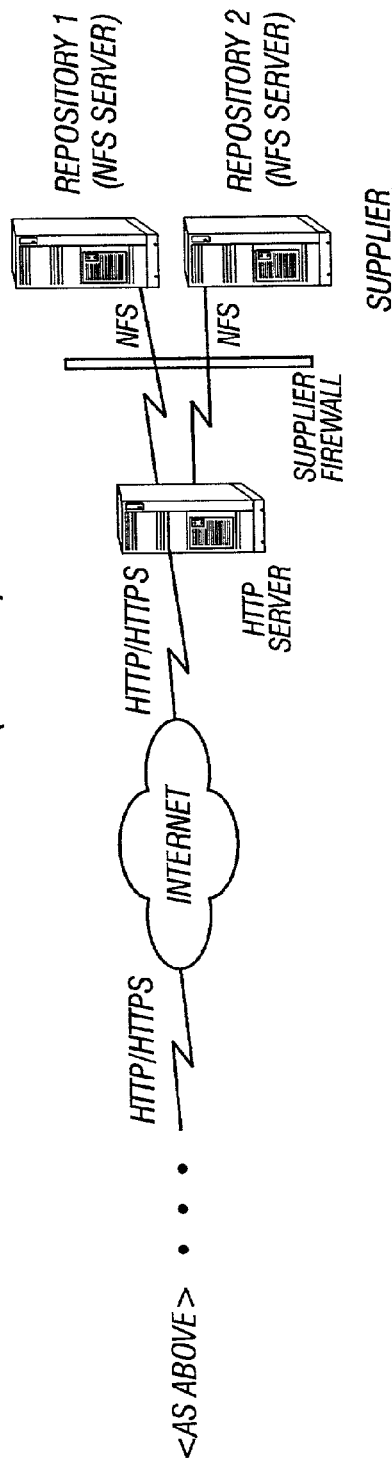
Figure 4C:
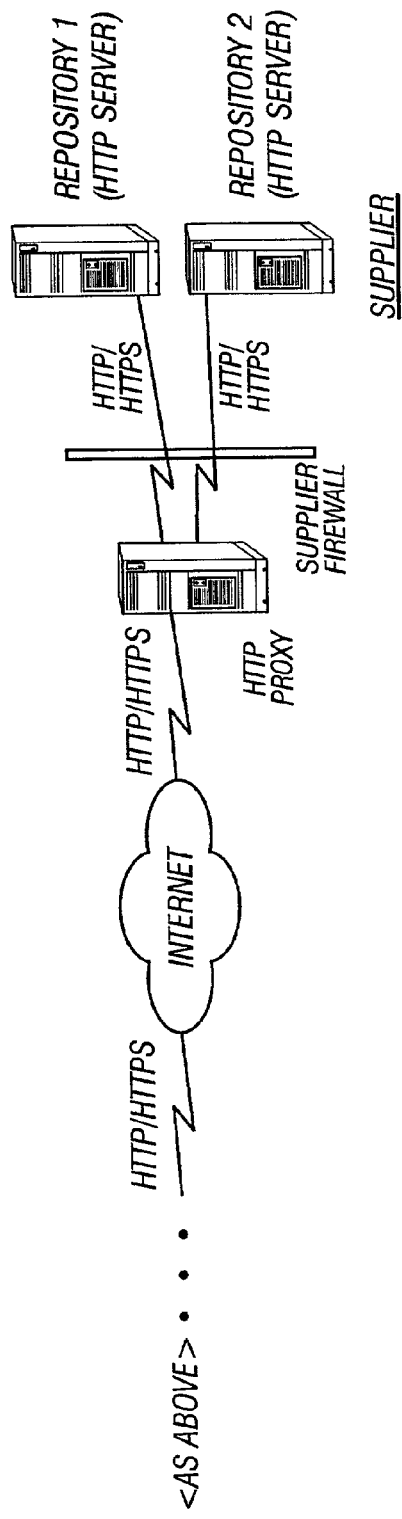
Figure 5A:
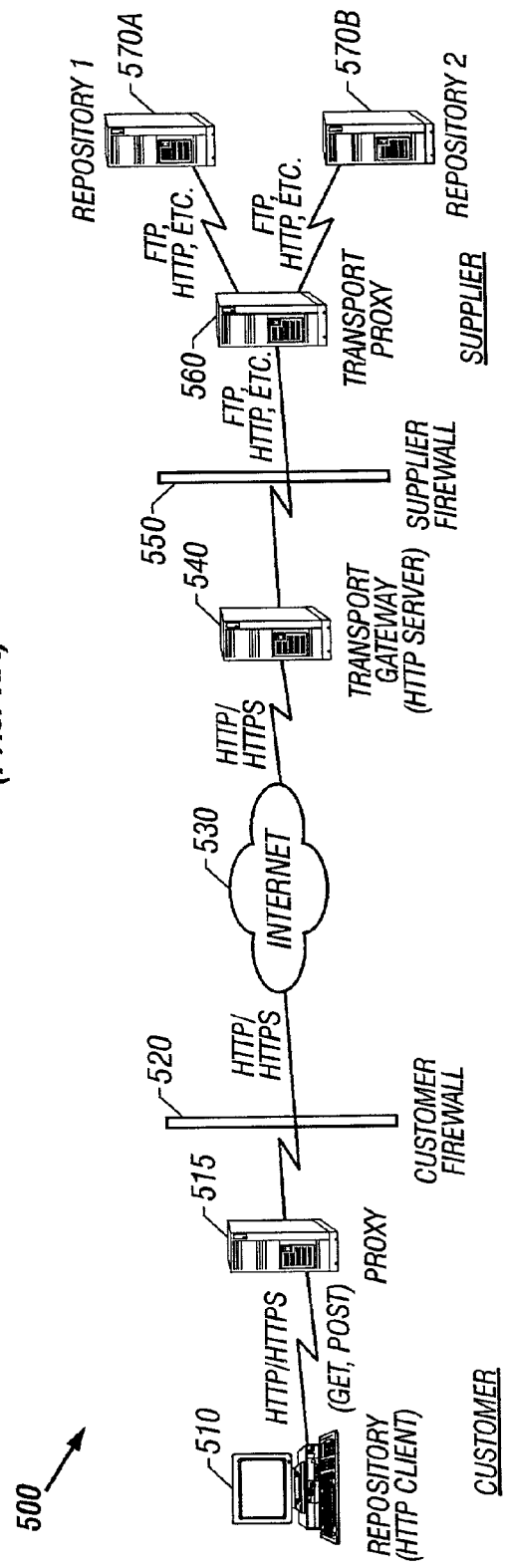
FIG. 5A is a block diagram illustrating an improved computer system for uploading and downloading files between distributed Supplier and Customer Repositories using HTTP, in accordance with some embodiments of the invention.

FIG. 5A is a diagram illustrating computer system 500 for uploading and downloading files between Supplier and Customer Repositories, in accordance with some embodiments of the invention. Computer system 500 includes a Customer Repository client computer 510 connected to a global-area computer network 530 (e.g., the Internet), optionally via a Customer Proxy 515 and the Customer Firewall 520. A Supplier Transport Gateway 540, also connected to global-area computer network 530, in turn is connected to one or more Supplier Repository server computers 570n (where n=A, B, C, . . . ), optionally via the Supplier Firewall 550 and a Supplier Transport Proxy 560.

Customer Repository client computer 510 is any general-purpose computer that is able to connect to other computers accessible over the Customer computer network using HTTP and/or HTTPS. Typically, Customer Repository client computer 510 includes network communication hardware and executes an operating system and other software necessary to communicate with other computers over the Customer computer network. For example, in some embodiments, Customer Repository client computer 510 is a Pentium- (or other x86 processor) based computer running under any version of the Microsoft Windows environment (e.g., 95, 98, NT or 2000). In other embodiments, Customer Repository client computer 510 may be an IA-64-based computer running under any flavor of the UNIX operating system (e.g., HP-UX, Linux). In some embodiments, Customer Repository client computer 510 executes a web browser (e.g., Microsoft Internet Explorer or Netscape Navigator) as an HTTP/HTTPS client. In other embodiments, Customer Repository client computer 510 executes a custom application program (e.g., a Supplier-authored file transfer client, provided to the Customer by the Supplier at the time the Supplier/Customer relationship is commenced) as an HTTP/HTTPS client.

In addition, Customer Repository client computer 510 maintains a permanent storage system (e.g. a file system or a database). The permanent storage system is the immediate source location for files to be uploaded to the Supplier Repository(s). It is also the immediate destination location for files to be downloaded from the Supplier Repository(s). Note that by "immediate" is meant that, in some embodiments, the files may ultimately reside on Customer Repository client computer 510 while, in other embodiments, the files may be staged on client computers 510 vis-à-vis other Customer computers, using other Customer processes, not illustrated in FIG. 5A.

Customer Repository client computer 510 may optionally use Customer Firewall 520 to protect the security of the data stored on client computer 510. As is well known to those skilled in the art, firewalls filter data transmitted to and from a computer connected to a network in accordance to pre-configured security settings. Computers that are connected to an external network via a firewall are generally referred to as being inside the firewall, while computers connected directly to a firewall through the external network are referred to as being outside the firewall. Thus, in FIG. 5A, Customer Repository client computer 510 is inside Customer Firewall 520 and global-area computer network 530 is outside Customer Firewall 520.

Typically, firewalls impose greater restrictions on communication pursuant to inbound connection requests than on communication pursuant to outbound connection requests. Nonetheless, for security reasons, it is uncommon for firewalls to be configured to allow every internal computer to send outbound connection requests through to the external network. In these cases, Customer Repository client computer 510 may optionally use Customer Proxy 515 to penetrate Customer Firewall 520 and gain access to external network 530. A proxy is a computer program executing on a general-purpose computer, equipped with an operating system and network communication hardware and software sufficient to allow communication with other computers on the network. In particular, a proxy computer is typically allowed cross-firewall access through the firewall for communication pursuant to either outbound connection requests, inbound connection requests, or, in some cases, both. The proxy program relays network traffic of one or more protocols (including HTTP/HTTPS) between internal and external networks, and thereby acts as a protocol-aware broker, security enforcer, or auditor. Thus, even if Customer Repository client computer 510 is not allowed by Customer Firewall 520 to initiate connections into global-area computer network 530, Customer Proxy 515 can be used as a relay by Customer Repository client computer 510 to achieve such access.

Customer Firewall 520 and Customer Proxy 515 are optional components of system 500 that may be used by the Customer as desired to address Customer security concerns. In some embodiments, Customers may dispense with either Customer Firewall 520, Customer Proxy 515, or both. In any case, Customer Repository client computer 510 can initiate and sustain connections with computer systems available via global-area computer network 530.

On the Supplier side of FIG. 5A, Supplier Transport Gateway 540 responds to connection requests placed by Customer Repository client computer 510 over global-area computer network 530. When such a connection is established, Customer Repository client computer 510 sends a request message, per the HTTP or HTTPS communication protocols, to indicate the file transfer transaction being requested (upload or download), and pertinent arguments (such as the virtual file name, or file content in the case of an upload). The HTTP POST method is used in this request message for file uploads. For file downloads, either the HTTP GET or POST methods are used.

Transport Gateway 540 includes a general-purpose computer capable of communicating with global-area computer network 530 and the Supplier computer network, including Supplier Repository server computers 570n. As such, Transport Gateway 540 typically employs an operating system and network communication hardware and software. As in the case of Customer Repository client computer 510, a variety of hardware and operating system choices are encompassed by the present invention.

Transport Gateway 540 further executes an HTTP server program. The HTTP server program responds to requests from Customer Repository client computer 510. In addition to the conventional functions performed by standard HTTP server programs, the HTTP server program on Transport Gateway 540 has several special responsibilities.

First, Transport Gateway 540 is responsible for selecting an appropriate Supplier Repository server computer 570n to handle the upload or download being requested. This selection, referred to herein as "routing", is based upon certain transaction request arguments ("routing tokens") provided by client computer 510 in the HTTP/HTTPS request message, with reference to selection rules ("routing rules") pre-configured on Transport Gateway 540 by the Supplier.

Second, Transport Gateway 540 is responsible for validating the transaction request sent by Customer Repository client computer 510. Validation is based on certain other transaction request arguments ("validation tokens") similarly provided by client computer 510 in the HTTP/HTTPS request message, in reference to validation tables pre-configured with Transport Gateway 540 by the Supplier. Validation may include security policies previously agreed upon by the Supplier and Customer but, in most embodiments, serves to confirm the authenticity and/or the authority of the transaction request.

Finally, if a transaction request is successfully routed and validated, Transport Gateway 540 is responsible for establishing a subsidiary connection to the selected Supplier Repository server computer 570n. Once such a connection is established, Transport Gateway 540 submits a corresponding transaction request (upload or download) to the selected Supplier Repository server computer 570n, relays the file content through until termination of the corresponding transaction, and sends a transaction response back to Customer Repository client computer 510. The transaction response is in the format of an HTTP/HTTPS response message understandable by client computer 510, and indicates the outcome of the transaction (success or failure; if failure, exception diagnostics are included) as well as response arguments (such as the file content, in the case of a download). Note that in some cases, a failure outcome may be originated locally on Transport Gateway 540, as in the case of a validation or routing failure. In other cases, a failure may be detected by Transport Gateway 540 from the outcome of the transaction with Supplier Repository server computer 570n. In those cases, the failure outcome sent by Transport Gateway 540 back to Customer Repository client computer 510 effectively relays the failure outcome received from the transaction with Supplier Repository server computer 570n.

The HTTP server program on Transport Gateway 540 can be implemented using various technologies. For example, in some embodiments, a conventional HTTP server program, such as Microsoft Internet Information Server or Apache Server, may be extended by the Supplier using any of a number of Web server extension technologies (CGI, FastCGI, server API, servlets, etc) to perform the special functions described in the previous sections. In other embodiments, a custom HTTP server program may perform all these functions.

Supplier Repository server computers 570n are likewise general-purpose computers capable of communicating with other computers in the Supplier network. As such, they are typically equipped with operating systems and network communication hardware and software. As in the case of Customer Repository client computer 510, Supplier Repository server computers 570n are also equipped with permanent storage systems (e.g., file systems or databases) which are the immediate source locations for downloadable files, as well as the immediate destination locations for uploaded files. Finally, Supplier Repository server computers 570n are further equipped with server programs. These are responsible for serving transaction requests initiated by Transport Gateway 540 in furtherance of file upload/download transactions initiated by Customer Repository client computer 510.

While transactions between Customer Repository client computer 510 and Transport Gateway 540 use HTTP or HTTPS, transactions between Transport Gateway 540 and Supplier Repository server computers 570n use various application-level protocols, suitable for synchronous file transfer, according to different embodiments of the invention. For example, in the preferred embodiment, HTTP is used because it is essentially the same protocol (HTTP/HTTPS) as is used in transactions between client computer 510 and Transport Gateway 540 (using the same protocol reduces implementation costs). Alternate embodiments, however, may use FTP to conduct upload/download transactions, and thus will bridge the HTTP/HTTPS communication between Customer Repository client computer 510 and Transport Gateway 540, with the FTP communication between Transport Gateway 540 and Supplier Repository server computers 570n.

Further note that even when client computer 510 and Transport Gateway 540 communicate via HTTPS, in the preferred embodiment, Transport Gateway 540 and server computers 570n use unsecured HTTP to conduct the transaction. This is because HTTP is cheaper to setup within the Supplier network than HTTPS, while being the same messaging protocol as HTTPS and hence easy to bridge from HTTPS. Furthermore, HTTPS is primarily used to ensure privacy across global-area computer network 530, a concern that often does not apply anyway to transactions spanning Transport Gateway 540 and server computers 570n.

In any case, it is often desirable to use a conventional Supplier Repository 570n server program, without the custom specialization of Transport Gateway 540, in situations where special functions are not required of Supplier Repository 570n server program. For example, if HTTP is used between Transport Gateway 540 and Supplier Repository server computers 570n, conventional GET and PUT methods can be utilized for file download and upload, respectively, in accordance with some embodiments of the present invention. In other embodiments in accordance with the present invention, however, it is desirable to use custom Supplier Repository 570n server programs, or custom extension programs to otherwise conventional server programs.

Supplier Firewall 550 optionally regulates access to the Supplier internal network, in much the same way as was discussed for Customer Firewall 520. In order to avoid the coupling of firewall configuration with topology, exhibited by HTTP prior art, Supplier Transport Proxy 160 is introduced. Again, this is in much the same manner as was discussed above with respect to Customer Proxy 515—except that Transport Proxy 560 fans-out communication pursuant to inbound transaction requests from Transport Gateway 540 to Supplier Repository server computers 570n. Supplier Firewall 550, in turn, is configured to allow such inbound-initiated communication between Transport Gateway 540 and Transport Proxy 560, to allow fan-out of such communication at Transport Proxy 560 to server computers 570n. Some embodiments of the present invention could alternatively forgo Supplier Firewall 550 and/or Transport Proxy 560, just as was mentioned above with respect to Customer Firewall 520 and/or Customer Proxy 515.

Finally, it is important to note that, in its preferred embodiment, protocols and client, proxy, and server software are carefully chosen such that file streaming is supported throughout computer system 500. As is known to those skilled in the art, streaming is the behavior of transferring files (or any large data) in relatively small pieces (called "packets") throughout components of a computer system such as illustrated in FIG. 5A. Streaming of such packets has two important characteristics. First, no more than a few packets are present on any one computer between the endpoints of the computer system at any given time. Thus, the only places where the file ever exists in its entirety are the sending and (eventually) receiving computers. Second, multiple packets are allowed to be en-route through the computer system at any given time. Thus, streaming may be likened to a firefighter's "bucket brigade" in which the total water supply is passed, in buckets, from one endpoint, through intervening points, to another, with multiple buckets in progress at any given time. Streaming is thus in contrast to a "store-and-forward" approach, where (as is known in the art) the file is passed in its entirety from one computer to another until the endpoint is reached.

Streaming is a feature of the preferred embodiment of the present invention, because of its efficiency and reliability benefits. For example, because non-endpoint streaming computers merely accommodate small pieces of an in-transit file at any given time, allocation of sufficiently-large memory or permanent storage on those computers to accommodate large files (with the concomitant performance and availability concerns) is obviated (unlike with store-and-forward). HTTP, HTTPS, and FTP are all stream-capable protocols, and many known client, proxy, and server program implementations of these protocols provide streaming (firewalls, too, support streaming). Thus, to enable streaming throughout, the preferred embodiment implements streaming in all components responsible for transferring file content. However, other embodiments of the invention may, for various reasons, forgo streaming at some or all components.

Figure 5B:
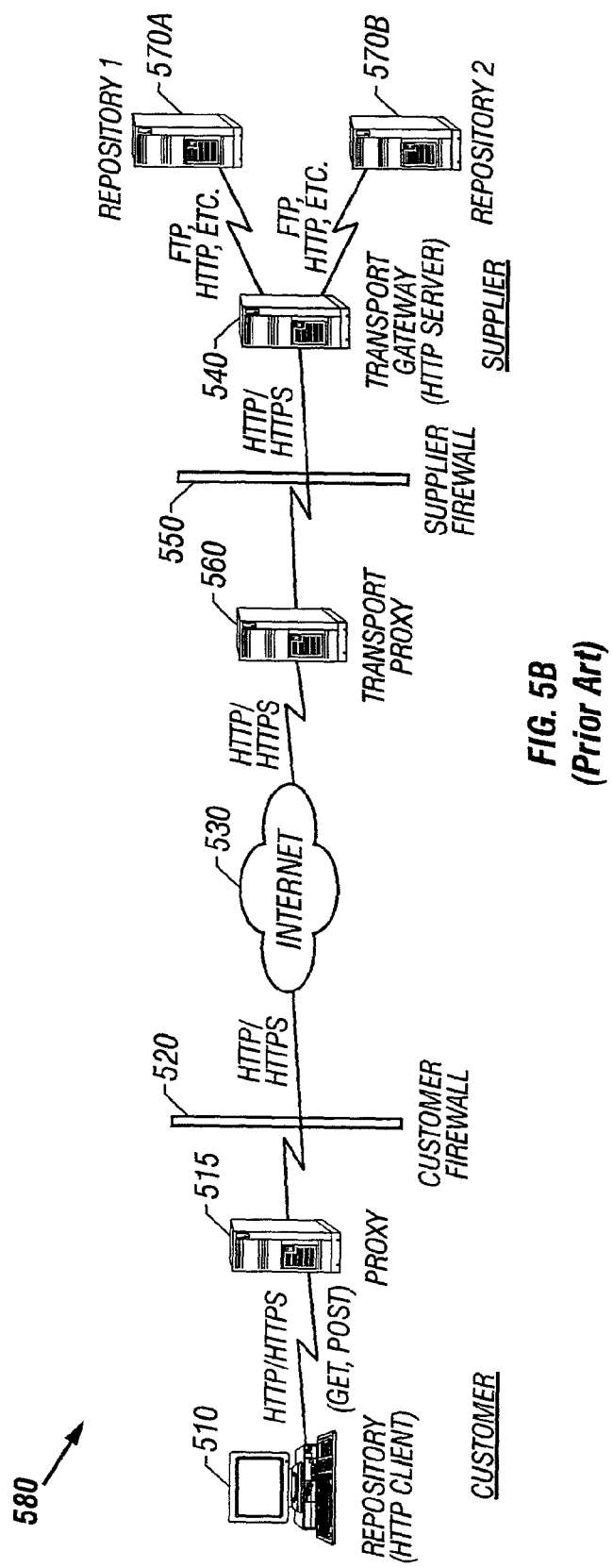
FIG. 5B is a block diagram illustrating an improved computer system for uploading and downloading files between distributed Supplier and Customer Repositories using HTTP, in accordance with some other embodiments of the invention.

FIG. 5B is a diagram illustrating a computer system 580 for uploading and downloading files between Supplier and Customer Repositories, in accordance with some embodiments of the invention. Computer system 500 in FIG. 5A and computer system 580 in FIG. 5B are identical, except that the locations of Supplier's Transport Gateway 540 and Transport Proxy 560 are reversed. In FIG. 5B, Transport Proxy 560 is located outside of Supplier Firewall 550, while Transport Gateway 540 is located inside. Customer Repository client computer 510 transaction requests are received by Transport Proxy 560 via global-area computer network 530 (and optionally Customer Proxy 515 and Customer Firewall 520, as in FIG. 5A). Transport Proxy 560 thus relays communication pursuant to such requests through Supplier Firewall 550 to Transport Gateway 540 for handling. Supplier Firewall 550 is pre-configured to allow inbound-initiated communication between Transport Proxy 560 and Transport Gateway 540. Transport Gateway 540, being located inside the firewall, is thus able to fan-out to Supplier Repository server computers 570n directly. In all other respects the system of FIG. 5B is the same as FIG. 5A.

The computer systems illustrated in FIGS. 5A and 5B thus each overcome the limitations of prior art solutions to the Supplier/Customer Problem. For example, the reality of independent Customer and Supplier computer networks, without direct connectivity to one another, but with Customer client-based and Supplier server-based connectivity to the Internet, is recognized and addressed to advantage. The related reality of Customer and Supplier firewalls segregating Customer and Supplier Repositories from the Internet is recognized and addressed by utilization of a Customer Proxy and a Supplier Transport Proxy.

Varied forms of Customer validation, beyond just those based on Supplier operating system user accounts, are provided by the Transport Gateway's support for application-specific authentication and/or authorization. Flexible routing of Customer requests against multiple Supplier Repositories, such that the Supplier Repository topology is hidden from Customers, with the resultant change-management benefits, is realized with the Transport Gateway's routing capability.

HTTP/HTTPS protocols are used for Customer connectivity to the Transport Gateway, while HTTP, FTP, or other well-suited, synchronous file transfer protocols are used between the Transport Gateway and Supplier Repositories. First, privacy across the Internet, as well as Supplier authentication, is achieved using HTTPS between the Customer and the Transport Gateway, satisfying the security concerns of sensitive Customers. Second, use of well-suited file-exchange protocols like HTTP, HTTPS, and FTP naturally confers support for transfer of arbitrary-size files with arbitrary content, without special encoding/decoding or de-assembly/re-assembly being required by the Repositories. Third, use of synchronous protocols like HTTP, HTTPS, and FTP naturally confers support for immediate delivery feedback, without special asynchronous acknowledgement.

Finally, the computer systems in FIGS. 5A and 5B use a minimum number of custom components, especially on the Customer side, thereby minimizing overall costs of construction and deployment. First, with respect to computer hardware, Customer Repositories, Proxy, and Firewall can all be pre-existing computers, previously deployed by Customers for purposes not necessarily related to Supplier/Customer file transfer. The same can also be true with respect to the Supplier Repositories and Firewall. Only the Transport Gateway and Transport Proxy computers may need to be newly deployed specifically for the present invention. Second, in terms of computer software, most software on the computers in the aforementioned systems can be pre-existing (i.e., already installed) or at least conventional (i.e., already authored, compiled, and tested by various vendors, such that only installation is required). In such situations, custom software development would be limited to the special Transport Gateway validation, routing, and relay functions discussed above. (In only those embodiments where it is not desired to use an existing HTTP/HTTPS client, such as a Web browser, on Customer Repositories, custom software development for a special Customer Repository file transfer client is also entailed.) This minimizes Supplier costs related to special software construction and deployment. Third, in terms of computer network configuration, use of the widespread GET and POST methods of the HTTP/HTTPS protocols for the Customer/Transport Gateway communication (rather than use of the less-widespread HTTP/HTTPS PUT method, or of the FTP protocol) is expected to better comply with common pre-existing Customer Firewall and Proxy configurations.

As has been reviewed above, the present invention makes use of several components worthy of further discussion. These firstly include HTTP request and response messages, used by the Customer Repository and Transport Gateway to negotiate file upload/download transactions. Secondly, there is included an overall Transport Gateway algorithm used to handle transactions beyond the handling performed by conventional HTTP server programs. And thirdly, there is included Transport Gateway validation and routing tables used in support of that algorithm. These components will now be discussed in the remainder of this detailed description.

The HTTP request message for a download transaction, sent from a Customer Repository to the Transport Gateway, conforms to the previously-incorporated HTTP protocol documentation. In particular, either the GET or POST methods are used. The URI identifies the HTTP server resource (e.g., server extension program) actually handling the download transaction. This may be a different resource than that which handles upload transactions, or the same (in which case a transaction request argument serves to distinguish download from upload requests). Finally, any of a variety of techniques known in the art for serializing and transporting application arguments in an HTTP request message is utilized to express the download transaction request arguments in the HTTP request message. For example, with method GET, a query string may be contained in the URI, including URL-encoded name/value pairs, one for each download transaction request argument. Alternately, with method POST, a similar query string may be contained in the request body.

Note that a general-purpose protocol for conveying remote procedure invocations (RMI) across HTTP may alternately be used to structure the download transaction HTTP request message. Indeed, such a general-purpose HTTP RMI protocol may be used for structuring all of the upload/download HTTP request/response messages described herein. One such protocol suitable for use with computer systems 500 and 580 is described in co-pending application Ser. No. 09/405,324, titled "System And Method For Conducting Arbitrary Transactions across the World Wide Web" by Daniel Scott Jorgenson, which is incorporated by reference herein in its entirety.

The download transaction request arguments conveyed in the HTTP request message from Customer Repository to Transport Gateway, as described above, include the following:

Validation Tokens: One or more tokens known to the Customer Repository and presented for purposes of authentication and/or authorization to the Transport Gateway. Different embodiments of the present invention may use different authentication/authorization models, and thus the actual nature of the validation token(s) depends on the embodiment. For example, in some embodiments, the validation tokens might include a User ID and a Password. In other embodiments, the validation tokens might include a Passcode from a smart card.

Routing Tokens: One or more tokens known to the Customer Repository and presented for purposes of Supplier Repository routing to the Transport Gateway. In different embodiments, routing tokens can include attributes of the file being transferred, attributes of the Customer Repository, and/or attributes of the Customer originating the request. Tokens should be selected to abstractly describe the Customer, Customer Repository and/or file being uploaded, using all of the general, descriptive terms which might prove likely to serve as the basis for routing at present or in the foreseeable future. By contrast, tokens that specifically identify or refer to Supplier Repository server computers, the Supplier departmental organization, or otherwise make presumptions upon Supplier Repository topology should not be chosen. (This advice is in furtherance of the aforementioned goal of shielding the Customer Repository from Supplier Repository topology changes.) Actual routing tokens will vary among different embodiments. For example, in some embodiments, the routing tokens might include a Customer Type, a Customer Country, and a File Type.

File Name: A reference name for the file to download, to be relayed in the corresponding download transaction request to the Supplier Repository. In some embodiments, this may be a physical file name; physical directory/folder location on the Supplier Repository operating system's file system may be included. In other embodiments, this may be a virtual file name: an alias mapped by the Supplier Repository server program to the actual physical file to download.

FIG. 6A shows a Customer Repository download transaction HTTP request message conforming to the above specifications, according to an exemplary embodiment. (Extra line breaks are introduced in FIG. 6A for readability; CR-LF denotes all physical line breaks.) The message is formatted according to the general method outlined in the aforementioned co-pending patent application, Ser. No. 09/405,324. In this exemplary embodiment, method GET 610 is used. Also, in this exemplary embodiment, both upload and download functions are embedded in the same HTTP server extension program, referenced by the URI 620 ("/tran/bin/xaction.p1"). Thus the download function is explicitly requested using the SWOP-Xaction request header 630 ("tranGet"). The query string 635 includes encoded name-value pairs for the download transaction request arguments. First, a session ID 625 ("HP-ESC-S-ID") and a session authenticator 632 ("HP-ESC-SAUTH") constitute the validation tokens. Second, a Customer Repository country name 637 ("Geography"), application name 639 ("AppName"), and application version 641 ("Version") constitute the routing tokens. Lastly, a virtual file name 643 ("FileName") indicates the file to download.

The HTTP response message for a download transaction, sent from the Transport Gateway back to the Customer Repository in response to such a download transaction HTTP request message, likewise conforms to the previously-incorporated HTTP protocol documents in all respects. In particular, it indicates the outcome of the transaction (success or failure) and, if a failure, qualifies it with further brief diagnostic information. Depending on the embodiment, this outcome may be conveyed in the HTTP status line, or, as in the method outlined in the aforementioned co-pending application Ser. No. 09/405,324, in a separate HTTP response extension header. Assuming the transaction was successful, the HTTP response message body will contain the file content, without any special encoding. Per the previous discussion on streaming, in a stream-enabled embodiment it is minimally this HTTP response body, carrying the file content, which would be streamed from Supplier Repository to Customer Repository.

Finally, some embodiments may include additional download transaction response arguments. These are placed in an HTTP response extension header using any of the same techniques for serializing application arguments discussed with respect to download transaction HTTP request messages. Such response arguments vary based on the embodiment. Some embodiments may have need for none, while others may include such items as:

File Ownership. Indicates user and group account ownership for the file.

File Permissions. Indicates security settings for access to the file by various user and/or group accounts.

File Timestamps. Indicates pertinent timestamps with respect to the file, such as the creation time, last-modification time, and last-access time.

In general, download response arguments such as these will only be available for inclusion in the download transaction HTTP response message, to the extent that the Supplier Repository server program provided them to the Transport Gateway via the corresponding download transaction response.

FIG. 6B shows a Transport Gateway download transaction HTTP response message conforming to the above specifications, according to an exemplary embodiment. (Again, extra line breaks are included for readability, while CR-LF denotes the actual physical line breaks.) The message is formatted according to the general method outlined in the aforementioned co-pending patent application, Ser. No. 09/405,324. HTTP status line 640 indicates with "200 OK" that the transaction succeeded from the HTTP server program's viewpoint. HTTP extension response header "SWOP-Status" 642 indicates with "1 0 OK" that the transaction succeeded from the HTTP server extension program's viewpoint. Raw file content ("Hello world" in this case) is in response body 650, and is correspondingly labeled as such by HTTP response header "Content-Type" 646 ("application/x-octet-stream"). Finally, HTTP extension response header "SWOP-Data" 644 contains some of the aforementioned optional download response arguments. These include "Owner" 645 and "Group" 647 which indicate file ownership, "Mode" 649 which indicates file permissions, and "Timestamps" 652—a serialized table structure indicating the file creation, last-modification, and last-access times. These download response arguments, like the file content itself, originated with the Supplier Repository and were included into the HTTP response message by the Transport Gateway in relay.

On the other hand, in the exemplary embodiment of FIG. 6B, if the download transaction had failed, "SWOP-Status" HTTP extension response header 642 would have been set to a different value diagnosing the failure, such as "−1 4001 No route to repository" or "−1 4002 File not found". HTTP extension header "SWOP-Data" 645 and HTTP response body 650 would have been absent or set to well-known null values in these cases.

The HTTP request message for an upload transaction, sent from a Customer Repository to the Transport Gateway, is similar to the download transaction HTTP request message. The upload transaction HTTP request message, like the download request message, conforms to the previously-incorporated HTTP protocol documentation in all respects. In particular, only the POST method is used. The URI in the upload transaction HTTP request message identifies the HTTP server resource, as it does in the download HTTP message (in some embodiments, a further transaction request argument is used to distinguish upload from download transaction types). The HTTP request body contains the file content, typically without any special encoding (but see next paragraph). Per the previous discussion on streaming, in a stream-enabled embodiment it is minimally this HTTP request body, carrying the file content, which would be streamed from Supplier Repository to Customer Repository.

As with download transaction request arguments in a download message, upload transaction request arguments are serialized and transported in an upload transaction HTTP request message. Any of a variety of techniques known in the art for serializing application arguments may be used to encode them into a string. In the preferred embodiment, the upload request argument string is carried in an HTTP extension request header where it will not interfere with the raw file content transported in the HTTP request body. For example, the method described in the aforementioned co-pending application Ser. No. 09/405,324, supports this approach. Other embodiments may instead transport both the upload request argument string and the file content in the HTTP request body. However, such embodiments often require additional encoding of the argument string and raw file content, in order to distinguish them from one another. For example, an embodiment using a conventional Web browser (such as Microsoft Internet Explorer or Netscape Navigator, neither of which currently support the aforementioned HTTP extension request header for upload request arguments) as the Customer Repository HTTP client, may instead place both upload request arguments and file contents, URL-encoded, into the HTTP request body. Furthermore, such encoding may interfere with the ability to effectively stream the HTTP request body at all points.

In any event, upload transaction request arguments in the HTTP request message from Customer Repository to Transport Gateway, as described above, include the following:

Validation Tokens: As with the download HTTP request message.

Routing Tokens: As with the download HTTP request message.

File Name: A reference name the Supplier Repository should assign to the file upon upload. The requested file name is relayed by the Transport Gateway to the Supplier Repository in the corresponding upload transaction request. As with the download HTTP request message, this may be a physical or virtual file name, depending on the embodiment.

In addition, in some embodiments additional file upload transaction request arguments may be implemented. These may include such items as:

File Ownership: Requests given user and group account ownership be assigned to the file upon upload to the Supplier Repository. The requested file ownership is relayed by the Transport Gateway to the Supplier Repository in the corresponding upload transaction request.

File Permissions: Requests given file security settings be assigned to the file upon upload to the Supplier Repository. The requested file permissions are relayed by the Transport Gateway to the Supplier Repository in the corresponding upload transaction request.

FIG. 6C shows a Customer Repository upload transaction HTTP request message conforming to the above specifications, according to an exemplary embodiment. (Extra line breaks are introduced in FIG. 6C for readability; CR-LF denotes all physical line breaks.) The message is formatted according to the general method outlined in the aforementioned co-pending patent application, Ser. No. 09/405,324. In this exemplary embodiment, method POST 660 is used. Also, in this exemplary embodiment, both upload and download functions are embedded in the same HTTP server extension program, referenced by the URI 662 ("/tran/bin/xaction.p1"). Thus the upload function is explicitly requested using the SWOPX-action request header 664 ("tranPut"). Raw file content ("Hello world", again) occupies request body 670, and is correspondingly labeled as such by HTTP request headers "Content-Type" 666 ("application/x-octet-stream") and "Content-Length" 668 ("11"). Finally, HTTP extension request header "SWOP-Data" 672 contains the aforementioned upload request arguments, as encoded name-value pairs. First, as in FIG. 6A, a session ID 679 ("HP-ESC-S-ID") and a session authenticator 676 ("HP-ESC-S-AUTH") constitute the validation tokens. Second, and also as in FIG. 6A, a Customer Repository country name 678 ("Geography"), application name 679 ("AppName"), and application version 680 ("Version") constitute the routing tokens. Third, a virtual file name 682 ("FileName") identifies the file being uploaded. Lastly, some of the aforementioned optional upload request arguments are included. These include "Owner" 681 and "Group" 683 which indicate file ownership to assign, and "Mode" 685 which indicates file permissions to assign.

The HTTP response message for an upload transaction, sent from the Transport Gateway back to the Customer Repository, likewise conforms to the previously-incorporated HTTP protocol documents in all respects. In particular, it indicates the outcome of the transaction (success or failure) and, if a failure, qualifies it with further brief diagnostic information. As with the download transaction HTTP response message, and depending on the embodiment, this outcome may be conveyed in the HTTP status line, or, as in the method outlined in the aforementioned co-pending application Ser. No. 09/405,324, in a separate HTTP response extension header. Generally there are no upload response arguments (although if there were, they could be conveyed in a manner similar to how download response arguments are conveyed in the download response message).

FIG. 6D shows a Transport Gateway upload transaction HTTP response message conforming to the above specifications, according to an exemplary embodiment. (Again, extra line breaks are included for readability, while CR-LF denotes the actual physical line breaks.) The message is formatted according to the general method outlined in the aforementioned co-pending patent application, Ser. No. 09/405,324. HTTP status line 688 indicates with "200 OK" that the transaction succeeded from the HTTP server program's viewpoint. HTTP extension response header "SWOP-Xaction" 690 indicates with "1 0 OK" that the transaction succeeded from the HTTP server extension program's viewpoint. As noted above, there is no need for further information in response to an upload request, so the message is complete at this point.

Thus the Customer Repository sends the preceding HTTP request messages to the Transport Gateway in order to initiate upload or download transactions; and the Transport Gateway sends the preceding HTTP response messages back to the Customer Repository to complete the respective transactions. Therefore it is the Transport Gateway's responsibility to receive a request message, process accordingly (including relaying file content with a Supplier Repository utilizing a corresponding upload/download transaction), and send a response message. The method used by the Transport Gateway to accomplish this processing is diagrammed in FIGS. 7A and 7B.

Figure 7A:
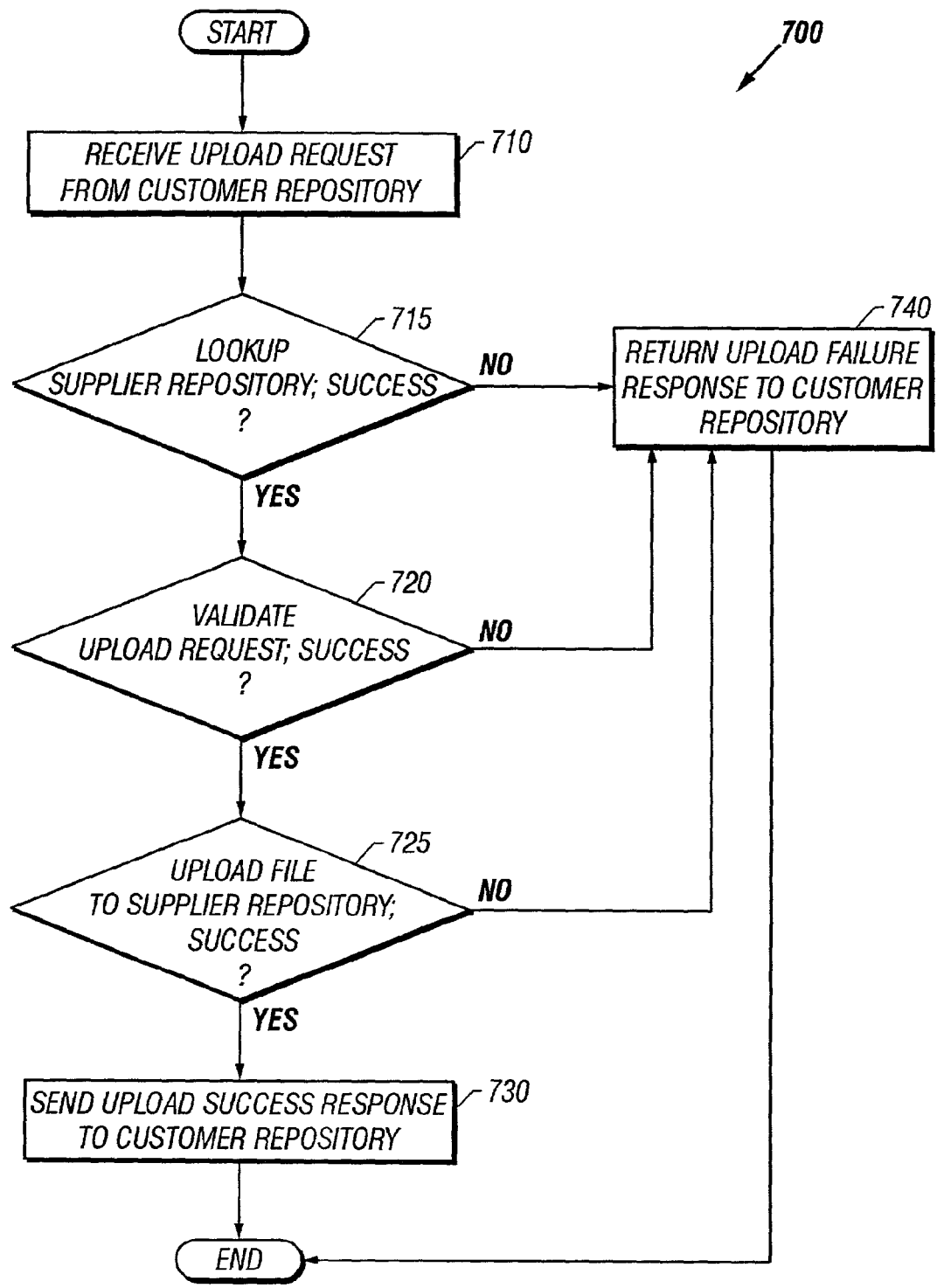
FIG. 7A is a Transport Gateway flow diagram of a file upload operation, in accordance with some embodiments of the present invention.

FIG. 7A is a flow diagram illustrating an upload operation 700 performed by Transport Gateway 540 in FIG. 5A (or Transport Gateway 540 in FIG. 5B). This operation is performed solely by the aforementioned HTTP server program executing on Transport Gateway 540; or by that HTTP server program in conjunction with an aforementioned HTTP server extension. First, in stage 710, Transport Gateway 540 receives an upload transaction HTTP request message from Customer Repository client computer 510 over global-area computer network 530. (As previously discussed for FIGS. 5A and 5B, this message in some embodiments is delivered also via Customer Proxy 515 and/or Customer Firewall 520. Furthermore, as previously discussed for FIG. 5B, this message in some embodiments is delivered also via Transport Proxy 560 and/or Supplier Firewall 550.)

Stage 715 then determines whether the request received from Customer Repository client computer 510 can be routed to one of Supplier Repository server computers 570*n*. Stage 515 is generally accomplished by extracting the routing tokens from the upload transaction HTTP request message (previously discussed), and comparing them to pre-configured routing rules. The routing rules map from various combinations of routing tokens to connection information (e.g., DNS name or IP address, port number, etc.) for various Supplier Repository server computers 570*n*. Each routing rule stipulates that upload requests containing the corresponding routing tokens are to be relayed (via a corresponding upload transaction discussed below) to the respective Supplier Repository server computer 570*n*. In some embodiments, the routing rules further allow for default rules to be applied in the case of unrecognized or absent routing tokens in the upload request message from Customer Repository client computer 510.

In all cases, actual routing rules are pre-configured in advance of operation 700 by the Supplier, based on the Supplier's understanding of Supplier Repository topology and potential routing token combinations that will be submitted by Customer Repositories. When this understanding changes (for example, when Supplier Repository topology changes), the routing rules often likewise need modification. Such pre-configuration of the routing rules, and subsequent modification thereof, occur via processes not within the scope of the present invention.

Likewise, actual routing token combinations used by each Customer Repository are pre-determined in advance of operation 700 by the Customer, based (for example) on advice from the Supplier. Such pre-determination of routing tokens to be used with a particular Customer Repository occurs similarly via processes not within the scope of the present invention.

As previously discussed, actual routing tokens vary from one embodiment of the present invention to another. Routing tokens should generally be chosen that describe attributes of the Customer originating the upload request, the Customer Repository originating the upload request, and/or the file being uploaded, in terms that serve as the basis for Supplier Repository selection. Routing rules can then be implemented to map these routing tokens to Supplier Repositories appropriate for handling upload transactions for those types of Customer, Customer Repository, or particular file. When Supplier Repository topology changes, therefore, only the routing rules need to change. As a result, Customer Repositories are sheltered from such changes.

In some embodiments of the present invention, for example, Customer Type might be a routing token, describing the type of Customer requesting the upload (e.g., consumer, small/medium business or enterprise), where the Supplier desires to use this criterion as a Supplier Repository selection factor. In other embodiments, Customer Geography may be used as a routing token, describing the geographic location of the Customer Repository (e.g., country or region), such that the Supplier can use this criterion as a selection factor. File Type (of the file being uploaded) is a third example of a routing token used in some embodiments.

In contrast, Supplier Repository server computer IP addresses or DNS names should not be used as routing tokens or, for that matter, any datum describing the Supplier (such as Supplier Department responsible for handling the file). Such Supplier-side information is topological in nature and thus defeats the purpose of routing tokens, which is to hide changes in Supplier Repository topology from Customers.

Various techniques known in the art can be applied to express routing rules. In some embodiments, plain files of an appropriate, regular format may be used. In alternate embodiments, a database table with an appropriate schema may be used. All such embodiments are encompassed by the present invention. In many embodiments, the routing rule set is small and stable enough to justify (on efficiency grounds) parsing and loading of the rule set into Transport Gateway 540's HTTP server/extension program memory prior to stage 715 (for example, at program start time). However, this is not a necessary feature of the invention.

If stage 715 determines from comparison of the routing rules with the upload request's routing tokens that the request is meant for a particular Supplier Repository server computer 570n, operation 700 proceeds to stage 720. Otherwise, a failure outcome is concluded and operation 700 proceeds to stage 740. At stage 740, an upload transaction HTTP response message is generated and sent from Transport Gateway 540 to Customer Repository client computer 510 over global-area computer network 530. (Traversing other relevant components as it goes, such as—in FIG. 5B—Supplier Firewall 550 and/or Transport Proxy 560, and—in both FIGS. 5A and 5B—Customer Firewall 520 and/or Customer Proxy 515.) The particular failure outcome (in this case, inability to route to a Supplier Repository) is distinctively flagged in the upload transaction HTTP response message, in a format as has already been discussed. After stage 740, the upload transaction is complete and operation 700 ends (or rather, returns to await the next HTTP request message).

Otherwise, at stage 720, Transport Gateway 540's HTTP server/extension program next determines whether the request received from Customer Repository client computer 510 is valid. Validation is generally accomplished by extracting the validation tokens from the upload request message (previously discussed), and referencing them against a validation table. Validation procedures will vary dramatically among different embodiments of the invention, but will often include Customer authentication and/or authorization steps.

As is known to those skilled in the art, authentication is any procedure that ensures the origin of an upload request truly corresponds to a recognized Customer. And as is similarly known, authorization is any procedure that ensures the recognized Customer is entitled to perform the particular upload to the particular Supplier Repository server computer 570n in question. Authentication is generally feasible at stage 720 in any embodiment where the validation table contains all Customer validation tokens known to the Supplier, such that each validation token is known only to the Supplier and the respective Customer. Furthermore, authorization is generally feasible at stage 220 in any embodiment where the validation table further contains a data structure for each Customer known to the Supplier, and where the data structure (rather like a ticket book) expresses activities the Customer is entitled to perform.

In all cases, actual validation table entries are pre-configured with the Supplier in advance of operation 200. Likewise, actual validation tokens used by each Customer Repository client computer 510 are pre-determined by the Customer Repository prior to operation 700. Such pre-determination occurs via processes outside of the scope of the present invention (but which could include, for example, Web-based Customer registration mechanisms, etc.).

Many techniques are known in the art for performing authentication and authorization, and which may be applied at stage 720. In particular, the validation table may be expressed as a plain file with an appropriate, regular format; database table(s) of a certain schema; or data structure(s) within Transport Gateway 540's session state, in which the results of prior validations during the session are cached (e.g., for performance reasons). Validation may ultimately be based on any model known in the art, such as the 2-key identifier/authenticator model (e.g., user ID and password), client authentication (digital signature) model, smart card systems, etc. In short, all such embodiments are encompassed by the present invention.

If stage 720 determines that the upload request message is valid, operation 700 proceeds to stage 725. Otherwise, a failure outcome is concluded and operation 700 proceeds to stage 740, and thence to completion (to await another upload transaction HTTP request message). The upload transaction HTTP response message generated at stage 740 distinctively flags the particular failure outcome (in this case, validation failure) according to the format previously discussed.

At stage 725, the file is uploaded to the selected Supplier Repository server computer 570n, using a corresponding upload transaction negotiated by Transport Gateway 540 and Supplier Repository server computer 570n. As previously discussed, in FIG. 5A this may involve additional relay through Supplier Firewall 550 and Transport Proxy 560 of the communication pursuant to the corresponding upload transaction. Note also that, as previously discussed, some embodiments of the present invention use the same application-level protocol for the corresponding transaction as is used for the original transaction, while other embodiments use a different protocol. For example, some embodiments use HTTP for the corresponding upload transaction when the original upload transaction uses HTTP, and HTTPS for the corresponding upload transaction when the original upload transaction uses HTTPS. The preferred embodiment, however, uses HTTP for the corresponding upload transaction regardless of whether the original uses HTTP or HTTPS. Finally, some embodiments use FTP or other well-suited, synchronous file transfer protocols for the corresponding upload transaction.

During stage 725, Transport Gateway 540 first establishes a connection with Supplier Repository server computer 570n. (Some embodiments, using connection-oriented protocols like FTP for the Transport Gateway/Supplier Repository communication, may instead re-use a previously-cached connection handle.) If a connection cannot be established, operation 700 proceeds to stage 740 and a distinctive upload transaction failure HTTP response message is transmitted to Customer Repository client computer 510.

Second, still during stage 725, once Transport Gateway 540 is connected to Supplier Repository server computer 570n, a corresponding upload transaction is conducted by Transport Gateway 540 and Supplier Repository server computer 570n, according to the protocol in use between them. This corresponding upload transaction relays to the Supplier Repository the file content, provided by Customer Repository client computer 510 in the original upload transaction HTTP request message body. It also relays such upload request arguments as are present in the original upload transaction HTTP request message from Customer Repository client computer 510 (such as the file name, file ownership, and file permissions). The relay continues, bridging the upload transaction HTTP request message (from Customer Repository client computer 510) with the corresponding upload transaction (to Supplier Repository server computer 570n), until the corresponding upload transaction completes with a success or failure outcome. Note that at this point during this relay, in the preferred embodiment where streaming is supported, file content in particular is streamed from Customer Repository client computer 510 all through the computer system 500 to the particular Supplier Repository server computer 570n.

If the corresponding upload transaction at stage 725 fails while in progress, operation 700 proceeds to stage 740. The upload transaction failure HTTP response message generated at stage 740 includes failure status relayed back, where applicable, from the Supplier Repository server computer 570n. For example, if Supplier Repository server computer 570n ran out of free permanent storage in which to receive the file, it would terminate the corresponding upload transaction by sending such an error response to Transport Gateway 540. Transport Gateway 540, in turn, would relay a distinctive upload transaction failure HTTP response message indicating the out-of-storage error back to Customer Repository client computer 510 at stage 740.

However, if the corresponding upload transaction at stage 725 succeeds, then Transport Gateway 540 closes the connection with Supplier Repository server computer 570n (unless a connection-oriented protocol and connection caching are used, as previously mentioned, in which case the connection is cached for potential re-use). Operation 700 then proceeds to stage 730, where an upload transaction success HTTP response message is generated and sent back to Customer Repository client computer 510. This upload transaction success HTTP response message contains such upload response arguments as were provided by the selected Supplier Repository server computer 570n in its successful completion of the corresponding upload transaction (in some embodiments, there are no such upload response arguments defined). Stage 730 then leads to completion, to await the next HTTP request message.

Figure 7B:
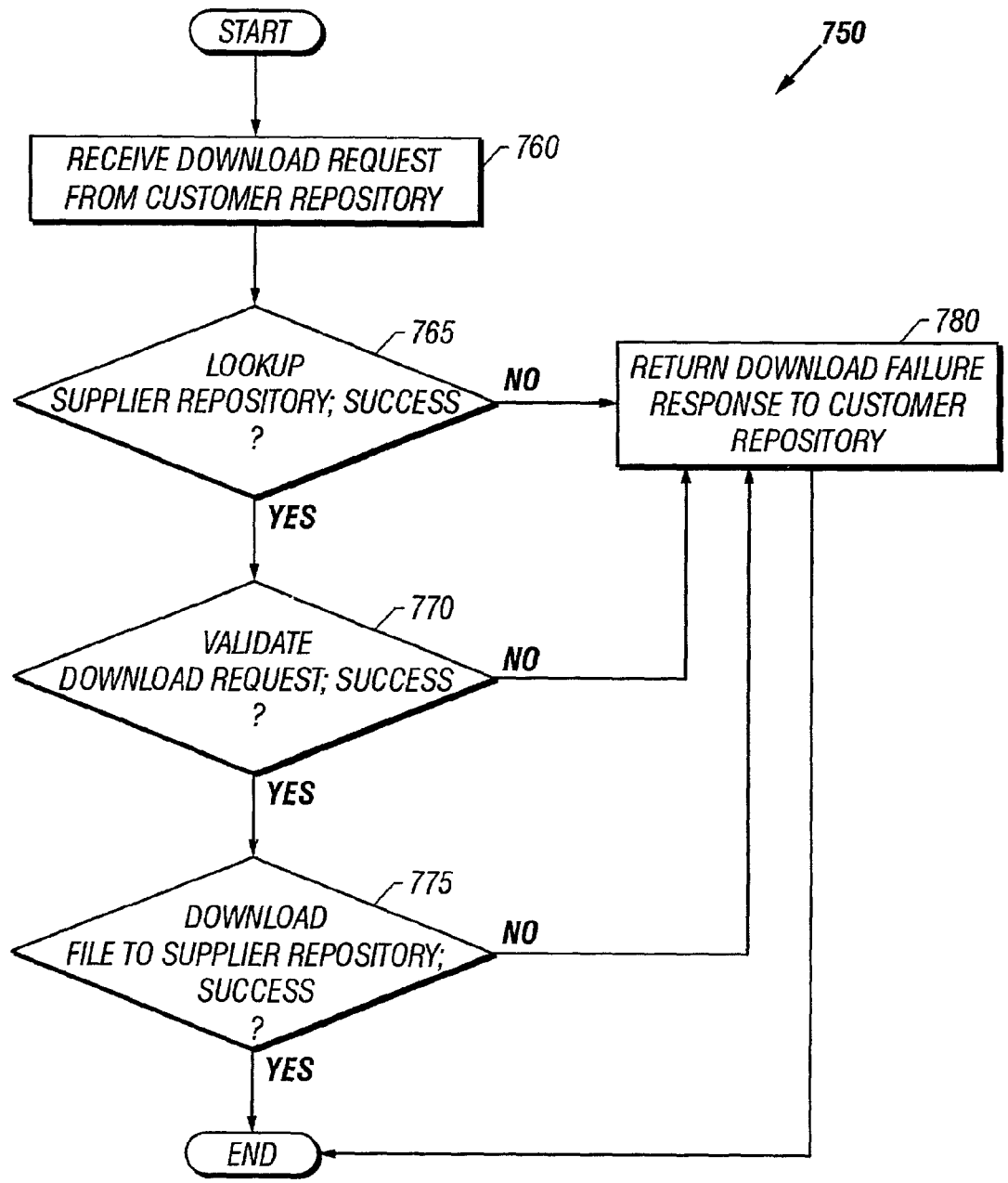
FIG. 7B is a Transport Gateway flow diagram of a file download operation, in accordance with some embodiments of the present invention.

FIG. 7B is a flow diagram illustrating a download operation 750 performed by Transport Gateway 540 in FIG. 5A (or Transport Gateway 540 in FIG. 5B). As with operation 700, operation 750 is performed solely by the aforementioned HTTP server program executing on Transport Gateway 540; or by that HTTP server program in conjunction with an aforementioned HTTP server extension program. First, in stage 760, Transport Gateway 540 receives a download transaction HTTP request message from Customer Repository client computer 510 over global-area computer network 530. (As previously discussed for FIGS. 5A and 5B, this message in some embodiments was delivered also via Customer Proxy 515 and/or Customer Firewall 520. And furthermore, as previously discussed for FIG. 5B, this message in some embodiments was delivered also via Transport Proxy 560 and/or Supplier Firewall 550.)

Stage 765 then determines whether the request received from Customer Repository client computer 510 can be routed to one of Supplier Repository server computers 570n. Routing in stage 765 is usually accomplished in precisely the same manner as is routing in stage 715 of FIG. 5A. In particular, the same routing tables and routing tokens are usually used. However, the present invention does not preclude use of divergent routing token and/or routing rule sets at stages 765 (download) and 715 (upload).

In the event a particular Supplier Repository server computer 570n cannot be determined at stage 765, operation 750 proceeds to stage 780 and thence to completion (to await the next HTTP request message). At stage 780, a routing failure outcome is transmitted within a download transaction HTTP response message back to Customer Repository client computer 510, in a similar manner as occurs in stage 740 of FIG. 7A. In particular, the download failure response message traverses other relevant components as it travels from Transport Gateway 540 back to Customer Repository client computer 110, such as (in FIG. 5B) Supplier Firewall 550 and/or Transport Proxy 560, and (in both FIGS. 5A and 5B) Customer Firewall 520 and/or Customer Proxy 515.

Otherwise, operation 750 proceeds to stage 770 where the validity of the download request message is evaluated. Validation at stage 770 is usually accomplished in precisely the same manner as is validation at stage 720 of FIG. 7A. In particular, the same validation model, authentication/authorization procedures, validation table and validation tokens are usually used. However, the present invention does not preclude use of divergent validation schemes at stages 770 (download) and 720 (upload).

In the event of validation failure at stage 770, operation 750 proceeds to stage 780 and thence to completion (to await the next HTTP request message). At stage 780, a validation failure outcome is transmitted within a download transaction HTTP response message back to Customer Repository client computer 510, in a similar manner as occurs in stage 740 of FIG. 7A.

Otherwise, operation 750 flows to stage 775, where the file is downloaded from the selected Supplier Repository server computer 570n, using a corresponding download transaction negotiated by Transport Gateway 540 and Supplier Repository server computer 570n. As previously discussed, in FIG. 5A this may involve additional relay of the transaction communication through Supplier Firewall 550 and Transport Proxy 560. Furthermore, the corresponding download transaction may use the same application-level protocol, or a different application-level protocol, as the original download transaction (in the same manner as with stage 725 of FIG. 7A).

First during stage 755, Transport Gateway 540 establishes a connection with Supplier Repository server computer 570n. (As discussed above with respect to stage 725 of FIG. 7A, some embodiments may instead re-use a previously cached connection handle to Supplier Repository server computer 570n.) If a connection cannot be established, operation 750 proceeds to stage 780 and a distinctive download transaction failure HTTP response message is transmitted to Customer Repository client computer 510.

Second, still during stage 775, once Transport Gateway 540 is connected to Supplier Repository server computer 570n, a corresponding download transaction is conducted by Transport Gateway 540 and Supplier Repository server computer 570n, according to the protocol in use between them. This corresponding download transaction begins by relaying to Supplier Repository server computer 570n such download request arguments as are present in the original download transaction HTTP request message from Customer Repository client computer 510 (such as file name). The corresponding download transaction continues by relaying the file content, provided by Supplier Repository server computer 570n, into the download transaction HTTP response message body sent by Transport Gateway 540 to Customer Repository client computer 510. It also relays in that download transaction HTTP response message to Customer Repository client computer 510 such additional download response arguments as are present in the Supplier Repository response (for example, file ownership, file permissions, and file timestamps). The relay continues, bridging the original download transaction HTTP response message (to Customer Repository client computer 510) with the corresponding download transaction (from Supplier Repository server computer 570*n*), until the corresponding download transaction completes with a success or failure outcome. Note that at this point during this relay, in the preferred embodiment where streaming is supported, file content in particular is streamed from Supplier Repository server computer 570*n* all through computer system 500 to Customer Repository client computer 510.

If the corresponding download transaction terminates in a failure outcome, then relay of file content into the original download transaction HTTP response body is terminated (prematurely if need be). Operation 750 then proceeds to stage 780 and thence to completion (to await the next request). In cases where the failure occurred early enough within stage 775 that file content relay never had a chance to even begin, stage 780 sends to Customer Repository client computer 510 a complete download transaction HTTP response message whose status headers indicate the failure outcome. Where applicable, the failure status indicated is obtained from Supplier Repository server computer 570*n*, and forwarded to Customer Repository client computer 510 in this error response message.

However, note that in many embodiments of the invention, notification of failure of the corresponding download transaction is not readily conveyable to Customer Repository client computer 510, in cases where the failure occurred in the middle of file content relay. This is because, as previously discussed, the HTTP response body within the download transaction HTTP response message to Customer Repository client computer 510 is allocated to the file content only; transaction outcome is allocated to the HTTP response headers, which come before the body. Thus by the time an HTTP response body containing file content is being relayed back by Transport Gateway 140, a "guess" at the transaction outcome must already have been indicated by Transport Gateway 540 within the response headers. Since the transaction will not have been complete by the time the "guess" is made, this means that the transaction outcome within the response headers may not necessarily be accurate. This is a complication with the present invention, but can be generally overcome if Transport Gateway 540 includes an HTTP "Content-Length" response header in the download response message, whose value is the size of the file being downloaded. This header can then be used by Customer Repository client computer 510 to infer whether such an "unannounced" failure has occurred, by comparing the expected content length with the byte count actually received. If they are the same, no in-transit failure occurred; but if they are different, it is likely an in-transit failure occurred.

On the other hand, if the corresponding download transaction at stage 775 completes successfully, then Transport Gateway 540 closes the connection with Supplier Repository server computer 570*n* (unless a connection-oriented protocol and connection caching are being used, as discussed previously, in which case the connection is cached for potential re-use). Stage 775 then moves to completion, to await the next HTTP request message.

Embodiments described above illustrate, but do not limit the invention. In particular, the invention is not limited by any particular hardware/software implementation. Other hardware/software configurations known in the art can be used in place of those described herein. In addition, the stages of processes 700 and 750 can be performed in an arbitrary order, unless otherwise indicated in the description above. Other embodiments and variations are within the scope of the invention, as defined by the following claims.

I claim:

1. A computer system comprising:
   one or more client computers connected to a global-area computer network;
   a transport gateway computer connected to the global-area computer network;
   a plurality of server computers connected to the transport gateway; and
   a transport gateway computer program executable by the transport gateway, the transport gateway computer program comprising computer instructions for:
   receiving a file transfer request from a client computer;
   selecting a repository on one of the server computers based on one or more routing tokens in the file transfer request, wherein the routing tokens include one or more attributes describing the file, the client computer or an originator of the file transfer request; and
   performing the requested file transfer.

2. The computer system of claim 1 wherein the transport gateway computer program further comprises computer instructions for determining whether an originator of the file transfer request is verifiably known.

3. The computer system of claim 1 wherein the transport gateway computer program further comprises computer instructions for determining whether an originator of the file transfer request is authorized to performed the requested file transfer.

4. The computer system of claim 1, wherein the file transfer request is received by the transport gateway from the requesting client computer using a first communication protocol and the file transfer request is sent by the transport gateway computer to the selected repository using a second communication protocol.

5. The computer system of claim 1, wherein the transport gateway computer program further comprises computer instructions for: establishing a communication path between the transport gateway computer and the selected repository; and sending a corresponding file transfer request to the selected repository, including information forwarded from the requesting client computer's file transfer request.

6. The computer system of claim 5, wherein the file transfer request is an upload request and the transport gateway computer program further comprises computer instructions for: relaying the file content from the requesting client computer to the selected repository; receiving a corresponding file upload response from the selected repository; forwarding information in the file upload response to the requesting client computer; and terminating the communication path between the transport gateway computer and the selected repository.

7. The computer system of claim 5, wherein the file transfer request is a download request and the transport gateway computer program further comprises computer instructions for: receiving a corresponding file download response from the selected repository; forwarding information in the file download response to the requesting client computer; relaying the file content from the selected repository to the requesting client computer; and terminating the communication path between the transport gateway computer and the selected repository.

8. The computer system of claim 1, wherein the requesting client computer connects to the transport gateway computer over the global-area computer network using an HTTP or HTTPS communication protocol and the transport gateway computer connects to the server computer storing the selected repository using an HTTP, HTTPS or FTP communication protocol.

9. The computer system of claim 1, wherein the client computers connect to the global-area computer network through a firewall and/or a proxy computer.

10. The computer system of claim 1, wherein the transport gateway computer connects to the server computers through a firewall and/or a proxy computer.

11. The computer system of claim 1, wherein the global-area computer network connects to the transport gateway computer through a firewall and/or a proxy computer.

12. A method of transferring file information between one or more client computers and one or more server computers over a global-area computer network, the method comprising:
receiving a file transfer request from a client computer;
selecting a repository on one of the server computers based on one or more routing tokens in the file transfer request, wherein the routing tokens include one or more attributes describing the file, the client computer or an originator of the file transfer request; and
performing the requested file transfer.

13. The method claim 12, further comprising determining whether an originator of the file transfer request is verifiably known.

14. The method claim 12, further comprising determining whether an originator of the file transfer request is authorized to performed the requested file upload.

15. The method of claim 12, wherein the file transfer request is received using a first communication protocol and the file transfer request is processed using a second communication protocol.

16. The method of claim 12, further comprising: establishing a communication path between the transport gateway computer and the selected repository; and sending a corresponding file transfer request to the selected repository, including information forwarded from the requesting client computer's file transfer request.

17. The method of claim 16, wherein the file transfer request is an upload request and the method further comprises: relaying the file content from the requesting client computer to the selected repository; receiving a corresponding file upload response from the selected repository; forwarding information in the file upload response to the requesting client computer; and terminating the communication path between the transport gateway computer and the selected repository.

18. The computer system of claim 16, wherein the file transfer request is a download request and the method further comprises: receiving a corresponding file download response from the selected repository; forwarding information in the file download response to the requesting client computer; relaying the file content from the selected repository to the requesting client computer; and terminating the communication path between the transport gateway computer and the selected repository.

19. A computer-readable storage medium comprising a routing computer program executable by a transport gateway connected to one or more client computers and one or more server computers, the transport gateway computer program comprising computer instructions for:
receiving a file transfer request from a client computer;
selecting a repository on one of the server computers based on one or more routing tokens in the file transfer request, wherein the routing tokens include one or more attributes describing the file, the client computer or an originator of the file transfer request; and
performing the requested file transfer.

20. The computer-readable storage medium of claim 19, wherein the transport gateway computer program further comprises computer instructions for determining whether an originator of the file transfer request is verifiably known.

21. The computer-readable storage medium of claim 19, wherein the transport gateway computer program further comprises computer instructions for determining whether an originator of the file transfer request is authorized to performed the requested file transfer.

22. The computer-readable storage medium of claim 19, wherein the file transfer request is received by the transport gateway from the requesting client computer using a first communication protocol and the file transfer request is sent by the transport gateway computer to the selected repository using a second communication protocol.

23. The computer-readable storage medium of claim 19, wherein the transport gateway computer program further comprises computer instructions for: establishing a communication path between the transport gateway computer and the selected repository; and sending a corresponding file transfer request to the selected repository, including information forwarded from the requesting client computer's file transfer request.

24. The computer-readable storage medium of claim 23, wherein the file transfer request is an upload request and the transport gateway computer program further comprises computer instructions for: relaying the file content from the requesting client computer to the selected repository; receiving a corresponding file upload response from the selected repository; forwarding information in the file upload response to the requesting client computer; and terminating the communication path between the transport gateway computer and the selected repository.

25. The computer-readable storage medium of claim 23, wherein the file transfer request is a download request and the transport gateway computer program further comprises computer instructions for: receiving a corresponding file download response from the selected repository; forwarding information in the file download response to the requesting client computer; relaying the file content from the selected repository to the requesting client computer; and terminating the communication path between the transport gateway computer and the selected repository.

26. The computer-readable storage medium of claim 19, wherein the requesting client computer connects to the transport gateway computer over the global-area computer network using an HTTP or HTTPS communication protocol and the transport gateway computer connects to the server computer storing the selected repository using an HTTP, HTTPS or FTP communication protocol.

27. The computer-readable storage medium of claim 19, wherein the client computers connect to the global-area computer network through a firewall and/or a proxy computer.

28. The computer-readable storage medium of claim 19, wherein the transport gateway computer connects to the server computers through a firewall and/or a proxy computer.

29. The computer-readable storage medium of claim 19, wherein the global-area computer network connects to the transport gateway computer through a firewall and/or a proxy computer.

* * * * *